(12) United States Patent  
Kuroda et al.

(10) Patent No.: US 8,412,670 B2  
(45) Date of Patent: Apr. 2, 2013

(54) APPARATUS, METHOD, AND PROGRAM FOR INTEGRATING INFORMATION

(75) Inventors: Ryuichi Kuroda, Kawasaki (JP); Kazuo Mineno, Kawasaki (JP); Toru Yoshibayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/184,285

(22) Filed: Jul. 15, 2011

(65) Prior Publication Data

US 2012/0185464 A1 Jul. 19, 2012

(30) Foreign Application Priority Data

Jul. 23, 2010 (JP) ................................. 2010-165698

(51) Int. Cl.  
*G06F 17/30* (2006.01)

(52) U.S. Cl. ....................................... 707/602; 707/803

(58) Field of Classification Search .................. 707/602, 707/803  
See application file for complete search history.

(56) References Cited

U.S. PATENT DOCUMENTS

| | | | |
|---|---|---|---|
| 6,014,670 A | 1/2000 | Zamanian et al. | |
| 6,339,775 B1 | 1/2002 | Zamanian et al. | |
| 7,496,571 B2 * | 2/2009 | Benedikt et al. | 1/1 |
| 7,934,207 B2 * | 4/2011 | Gustafsson et al. | 717/143 |
| 2006/0101073 A1 * | 5/2006 | Popa et al. | 707/104.1 |
| 2006/0253476 A1 * | 11/2006 | Roth et al. | 707/100 |
| 2007/0055655 A1 * | 3/2007 | Bernstein et al. | 707/3 |
| 2011/0295865 A1 * | 12/2011 | Carroll et al. | 707/756 |

FOREIGN PATENT DOCUMENTS

| | | |
|---|---|---|
| JP | 11-25126 A | 1/1999 |
| JP | 2004-30179 A | 1/2004 |

\* cited by examiner

*Primary Examiner* — Cheryl Lewis  
(74) *Attorney, Agent, or Firm* — Fujitsu Patent Center

(57) ABSTRACT

An information integration method performed by a computer that transforms data extracted from an information source and loads the transformed data onto a storage destination, the information integration method includes detecting a schema modification of the information source by comparing first schema information with second schema information; searching a correspondence table storage unit for an attribute value of an item related to the schema modification; generating a post-modified data model by correcting a pre-modified data model using the item information corresponding to the attribute value of the item related to the schema modification when the attribute value of the item related to the schema modification is hit in the correspondence table storage unit, and storing the post-modified data model on a storage device; and generating a post-modified integration logic and storing the post-modified integration logic on the metadata information storage unit.

20 Claims, 30 Drawing Sheets

FIG. 3

| SCHEMA | MODEL | TYPE | CONDITION |
|---|---|---|---|
| NUMBER | NUMBER | DEFAULT | |
| DECIMAL | INTEGER | DEFAULT | LENGTH=<31 SCALE=0 |
| DECIMAL | NUMBER | DEFAULT | |
| INTEGER | INTEGER | DEFAULT | |
| CHAR | STRING | DEFAULT | |
| NCHAR | STRING | DEFAULT | |
| FLOAT | NUMBER | AUTO | |

FIG. 4

| FROM | TO | COST | NEQ |
|---|---|---|---|
| ANY | ANY | 0 | |
| JEF | SJIS | 30 | |
| JEF | U90 | 20 | |
| SJIS | JEF | 30 | |
| SJIS | U90 | 5 | |
| SJIS | UTF16 | 40 | |
| SJIS | UTF8 | 20 | |
| UTF8 | UTF16 | 50 | |
| UTF8 | SJIS | 40 | O |
| U90 | SJIS | 5 | |
| U90 | UTF8 | 20 | |
| U90 | UTF16 | 30 | |

FIG. 5

| FROM | TO | COST | NEQ |
|---|---|---|---|
| ANY | ANY | 0 | |
| NUMBER | INTEGER | 20 | O |
| NUMBER | STRING | 40 | |
| INTEGER | SHORT | 10 | O |
| INTEGER | NUMBER | 30 | O |
| INTEGER | STRING | 40 | |
| SHORT | INTEGER | 5 | |
| SHORT | STRING | 40 | |
| STRING | NUMBER | 100 | |
| STRING | INTEGER | 60 | |

FIG. 6

| FROM | TO | COST | NEQ |
|---|---|---|---|
| ANY | ANY | 0 | |
| CR | CR+LF | 10 | |
| CR | LF | 10 | |
| LF | CR | 10 | |
| LF | CR+LF | 10 | |
| CR+LF | CR | 10 | |
| CR+LF | LF | 10 | |

FIG. 7

| FROM | TO | COST | NEQ |
|---|---|---|---|
| N | N | 0 | |
| N | OVER(N) | 5 | |
| N | UNDER(N) | 5 | O |

FIG. 8

| FROM | TO | COST | NEQ |
|---|---|---|---|
| ANY | ANY | 0 | |
| BIG | LITTLE | 10 | |
| LITTLE | BIG | 10 | |

FIG. 9

DB31(SJIS) ──901

| EMPLOYEE NO. | NUMBER(6,0) |
|---|---|
| NAME | STRING(20) |
| PHONE NO. | STRING(11) |

DB33(UTF16) ──902

| EMPNO | NUMBER(8,0) |
|---|---|
| DEPT | STRING(40) |

DB51(UTF16) ──903

| EMPLOYEE NO. | STRING(6) |
|---|---|
| NAME | STRING(20) |
| SECTION | STRING(40) |

FIG. 14

SCHEMA DEFINITION 1405

```
<schema>
  <name>DEPT</name>
  <type>COBOL</type>
  <character_code>euc</character_code>
  <endian>LITTLE</endian>
  <data_structure>                                    1411
    <source_file>DEPARTMENT.TXT</source_file>
  </data_structure>
<schema>
```

DEPARTMENT.txt 1407

```
000100 01  DEPT.
000210    03  EMPNO      PIC 9(6).
000220    03  DEPTNAME   PIC N(50).
000230    03  EXT        PIC X(9).
```

SCHEMA DEFINITION 1401

```
<schema>
  <name>EMPLOYEE MASTER</name>
  <type>Oracle</type>
  <character_code>AL32UTF8</character_code>
  <endian>LITTLE</endian>
  <data_structure>                                 1409
    <source_file>employee_master.sql</source_file>
  </data_structure>
<schema>
``` employee_master.sql 1403

```
CREATE TABLE "EMPLOYEE MASTER"
("EMPLOYEE NO." NUMBER(6,0),
 "NAME" NCHAR(20),
 "PHONE NO." CHAR(11),
 PRIMARY KEY "EMPLOYEE NO.")
```

FIG. 22

PRE-MODIFIED DATA MODEL

| EMPNO | NUMBER(8,0) | O |
|---|---|---|
| DEPT | STRING(40) | O |
| EXT | STRING(11) | |

POST-MODIFIED DATA MODEL

| EMPNO | NUMBER(8,0) |
|---|---|
| DEPT | STRING(40) | ically pointed out in the claims.
APPARATUS, METHOD, AND PROGRAM FOR INTEGRATING INFORMATION

CROSS-REFERENCE TO RELATED APPLICATIONS

This application is based upon and claims the benefit of priority of the prior Japanese Patent Application No. 2010-165698, filed on Jul. 23, 2010, the entire contents of which are incorporated herein by reference.

FIELD

The present invention relates to an information integration technique.

BACKGROUND

In a technique called extract transform load (ETL), data accumulated in an information source system is extracted, the extracted data is transformed into data in a specific format, and the transformed data is loaded in a storage destination system (for example, data warehouse). This series of processes is referred to information integration.

Related art techniques of information integration are available as described below. For example, transform processes are performed on source data via a plurality of transform objects. The data is finally mapped to a target system. The transform process is performed on prepared metadata in accordance with each transform object.

Japanese Unexamined Patent Application Publication No. 11-25126 describes a technique that reduces a cost for building a data warehouse by preparing a mapping table when data is transferred from an existing system to the data warehouse. According to an item name of the existing system as a key, the mapping table specifies (1) an item name and a data format the item is to take in a table of a database in the data warehouse, and (2) a transform logic needed to transfer the item.

Japanese Unexamined Patent Application Publication No. 2004-30179 discloses a technique that speeds up an access process to schema information. The schema information of a database is collected and retained. The retained schema information is compared with schema information acquired again in response to an instruction from a user to obtain difference data.

The above-described techniques of the information integration system do not account for a modification in schema in the information source. If a modification takes place, data transform is not appropriately performed. In a related art technique, an administrator re-produces a logic for data transform. Such a manner leads to an increase in operation costs.

SUMMARY

According to an aspect of the embodiment, an information integration method performed by a computer that transforms data extracted from an information source and loads the transformed data onto a storage destination, the information integration method includes detecting a schema modification of the information source by comparing first schema information acquired from the information source with second schema information acquired from the information source prior to modifying the first schema information; searching a correspondence table storage unit for an attribute value of an item related to the schema modification, the correspondence table storage unit storing the attribute value included in schema information and item information of a data model, with the attribute value mapped to the item information; generating a post-modified data model by correcting a pre-modified data model stored on a metadata information storage unit using the item information corresponding to the attribute value of the item related to the schema modification when the attribute value of the item related to the schema modification is hit in the correspondence table storage unit, the metadata information storage unit storing the pre-modified data model corresponding to the second schema information, and storing the post-modified data model on a storage device; and generating a post-modified integration logic and storing the post-modified integration logic on the metadata information storage unit, the post-modified integration logic transforming the post-modified data model stored on the storage device into a data model corresponding to the storage destination.

The object and advantages of the embodiment will be realized and attained by at least the features, elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 illustrates an example of data stored on a correspondence table storage unit;

FIG. 4 illustrates an example of data stored on a transform path table storage unit;

FIG. 5 illustrates an example of data stored on the transform path table storage unit;

FIG. 6 illustrates an example of data stored on the transform path table storage unit;

FIG. 7 illustrates an example of data stored on the transform path table storage unit;

FIG. 8 illustrates an example of data stored on the transform path table storage unit;

FIG. 9 illustrates an example of data stored on a metadata information storage unit;

FIG. 14 illustrates a collection method of the schema information;

FIG. 22 illustrates a deletion flag;

DESCRIPTION OF EMBODIMENTS

The embodiments of the technique of the invention are described below in detail with reference to the drawings.

Figure 1:
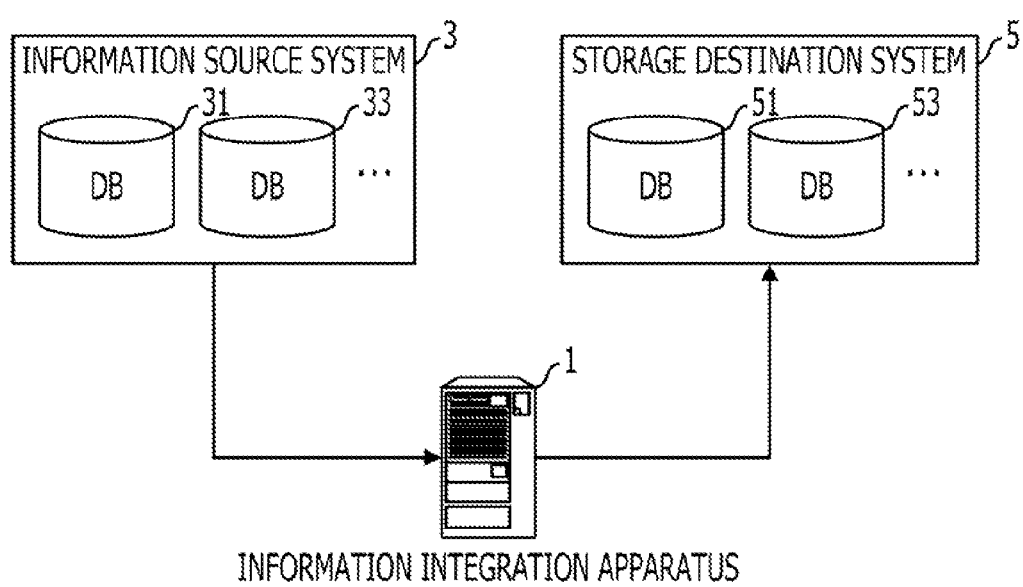
FIG. 1 illustrates a configuration of a system of one embodiment of the technique.

FIG. 1 illustrates a configuration of a system of one embodiment of the technique. An information integration apparatus 1 is connected to an information source system 3, including database (DB) 31 and DB 33 (also called a data source), and a storage destination system 5, including DB 51 and DB 53. The system of FIG. 1 performs information integration. More specifically, the information integration apparatus 1 transforms data extracted from one of the DB 31 and DB 33 in the information source system 3 into data in a specific format, and loads the transformed data on one of the DB 51 and the DB 53 in the storage destination system 5. The data loaded on one of the DB 51 and the DB 53 is used by a user who operates a user terminal (not illustrated). In FIG. 1, the number of DBs included in the information source system 3 and the storage destination system 5 is two, but no limit is imposed on the number of DBs included there.

Figure 2:
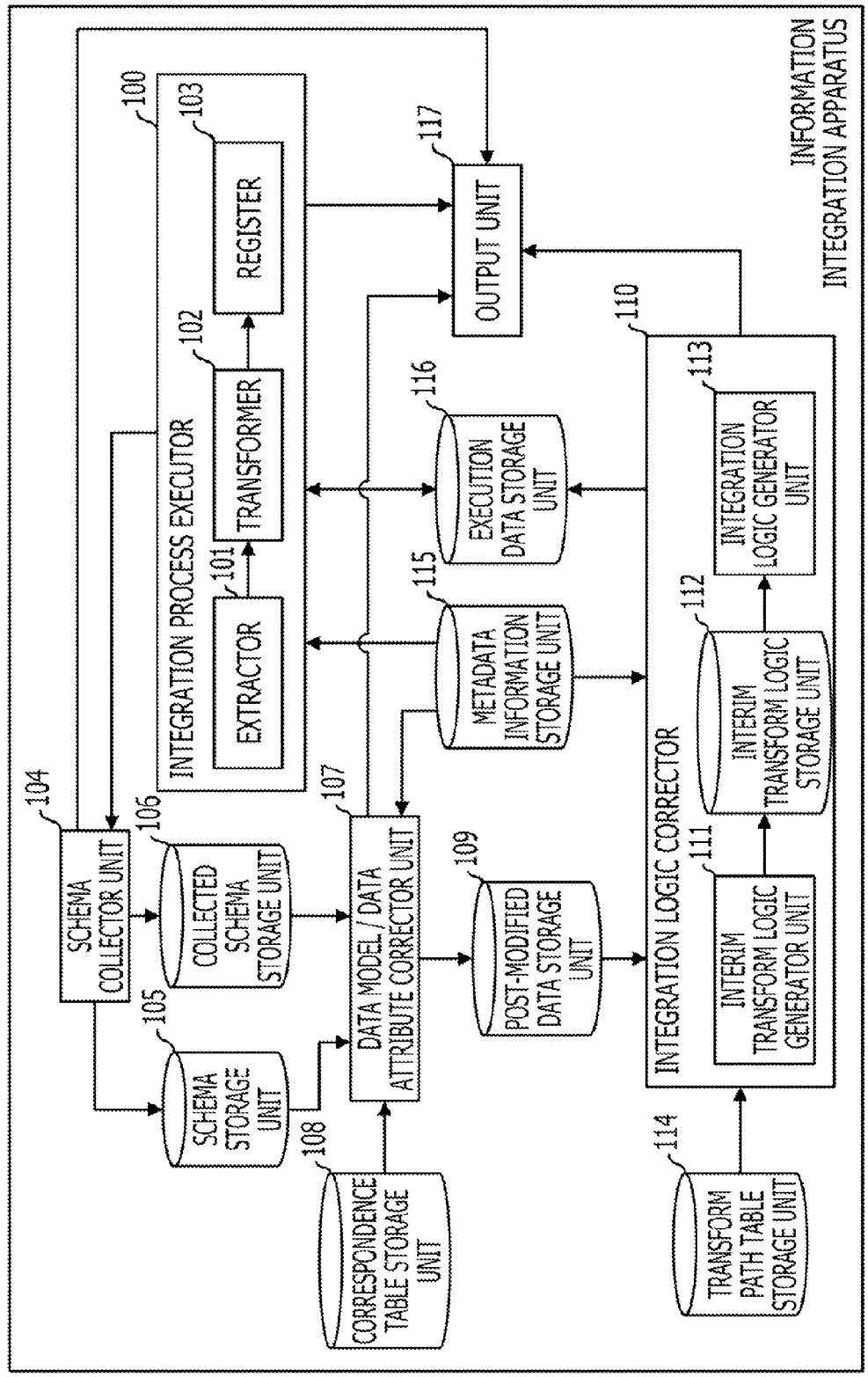
FIG. 2 is a function block diagram of an information integration apparatus.

FIG. 2 is a function block diagram of the information integration apparatus 1. The information integration apparatus 1 includes information process executor 100, schema collector unit 104, schema storage unit 105, collected schema storage unit 106, data model/data attribute corrector unit 107, correspondence table storage unit 108, post-modified data storage unit 109, integration logic corrector 110, transform path table storage unit 114, metadata information storage unit 115, execution data storage unit 116, and output unit 117. The information process executor 100 includes extractor 101, transformer 102, and register 103. The integration logic corrector 110 includes interim transform logic generator unit 111, interim transform logic storage unit 112, and integration logic generator unit 113.

In the discussion of the embodiment, data representing a structure of data, such as a data type or a data length, is referred to as "data model," and data representing characteristics, such as character code and endian, is referred to as "data attribute." The data model and the data attribute are described in an abstract form that does not depend on the type of database serving as an information source.

The extractor 101 extracts data from one of the DB 31 and the DB 33 in the information source system 3, and outputs the extracted data to the transformer 102. The transformer 102 transforms data in accordance with data stored on the metadata information storage unit 115 and outputs the transformed data to the register 103. The register 103 loads the data received from the transformer 102 on one of the DB 51 and the DB 53 in the storage destination system 5. The schema collector unit 104 stores collected schema information on the collected schema storage unit 106 or updates schema information stored on the schema storage unit 105. The data model/data attribute corrector unit 107 performs a data model/data attribute correction process to be discussed later, in accordance with data stored on the schema storage unit 105, the collected schema storage unit 106, the correspondence table storage unit 108, and the metadata information storage unit 115. The data model/data attribute corrector unit 107 stores the process results on the post-modified data storage unit 109. The interim transform logic generator unit 111 performs an interim transform logic generation process to be discussed later, in accordance with data stored on the post-modified data storage unit 109, and data stored on the metadata information storage unit 115. The interim transform logic generator unit 111 stores the process results on the interim transform logic storage unit 112. The integration logic generator unit 113 performs a post-modified integration logic generation process to be discussed later, in accordance with data stored on the transform path table storage unit 114, the metadata information storage unit 115, and the interim transform logic storage unit 112. The integration logic generator unit 113 then stores the process results on the execution data storage unit 116. Each of the units outputs the process results to a display unit via the output unit 117.

FIG. 3 illustrates an example of data stored on the correspondence table storage unit 108 (metadata information correspondence table). The metadata information correspondence table of FIG. 3 includes a "Schema" column, a "Model" column, a "Type" column, and a "Condition" column. The metadata information correspondence table stores a mapping rule that maps information expressed in a form unique to one of the DB 31 and the DB 33 as an information source to a data model and a data attribute of the information integration apparatus 1. The "Schema" column lists an attribute value of an item included in the schema information collected from one of the DB 31 and the DB 33. The "Model" column lists item information in the data model and the data attribute of the information integration apparatus 1. For example, data at a third row represents that an attribute value "DECIMAL" in the schema information corresponds to item information "Number." The "Type" column lists data representing the type of a mapping rule. For example, "default" indicates that the listed data is default data, "user" indicates that the listed data is data added by an administrator of the information integration apparatus 1, and "auto" indicates that the listed data is data added in an item information addition process to be discussed later. The "Condition" column lists data related to application conditions. The metadata information correspondence table is prepared for each type of database (such as Oracle, COBOL) as an information source. The metadata information correspondence table is also prepared for each of the types such as the data type, the data length, and the endian.

FIG. 4 illustrates an example of data stored on the transform path table storage unit 114. FIG. 4 illustrates an example of the transform path table for transforming a character code. The transform path table of FIG. 4 includes a "From" column representing a value prior to transformation, a "To" column representing a value subsequent to transformation, a "Cost" column representing the complexity of transformation, and a "NEQ" column receiving a setting of non-equivalence flag. The NEQ flag represents a possibility that once data is transformed, the data becomes non-equivalent (with part of the information lost). For example, data at a ninth row represents that the NEQ flag is set. The NEQ flag indicates the presence of a character that is difficult to transform from "UTF-8" to "SJIS".

FIGS. 5-8 illustrate examples of data stored on the transform path table storage unit 114. FIG. 5 illustrates an example of the transform path table for transforming the data type.

Figure 7:
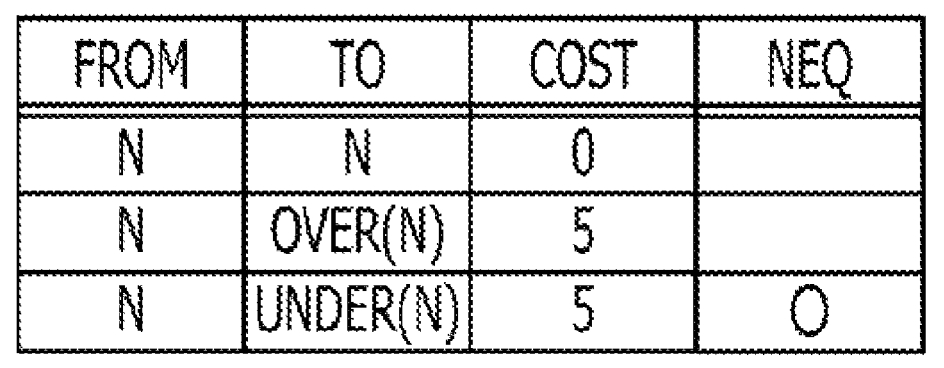

FIG. 6 illustrates an example of the transform path table for transforming a line-feed code. FIG. 7 illustrates an example of the transform path table for transforming the number of digits. FIG. 8 illustrates an example of the transform path table for transforming an endian. The data format of the transform path tables of FIGS. 5-8 remains unchanged from that of FIG. 4.

Figure 10:
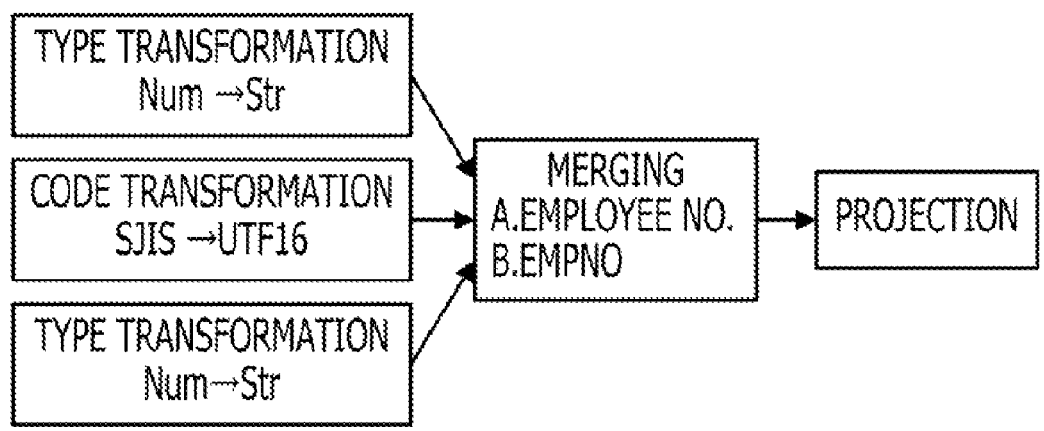
FIG. 10 illustrates an example of data stored on the metadata information storage unit.

FIGS. 9 and 10 illustrate examples of data stored on the metadata information storage unit 115. FIG. 9 illustrates an example of the data model and the data attribute stored on the metadata information storage unit 115. The data of FIG. 9 includes a data model and data attribute 901 corresponding to the DB 31, a data model and data attribute 902 corresponding to the DB 33, and a data model and data attribute 903 corresponding to the DB 51.

FIG. 10 illustrates an example of data of an integration logic stored on the metadata information storage unit 115. The integration logic of FIG. 10 transforms the data model and data attribute 901 and the data model and data attribute 902 into the data model and data attribute 903. More specifically, the integration logic of FIG. 10 includes a logic for transforming a data type of an item "Employee No." from "Number" to "String," a logic for transforming the character code from "SJIS" to "UTF-16," a logic for transforming a data type of an item "EMPNO" from "Number" to "String," a logic for linking "Employee No." and "EMPNO," and a projecting logic for extracting necessary data only.

The metadata information storage unit 115 stores the data model and data attribute corresponding to each database as an information source, the data model and data attribute corresponding to a storage destination database, and data of an integration logic for transforming the data model and data attribute of the information source database to the data model and data attribute of the storage destination database. The metadata information storage unit 115 also stores information related to each database serving as an information source (such as a connection method).

Processes of the information integration apparatus 1 of FIG. 2 is described below with reference to FIGS. 11-29. A process to be performed for the first execution of the integration logic is described with reference to FIGS. 11-14.

Figure 11:
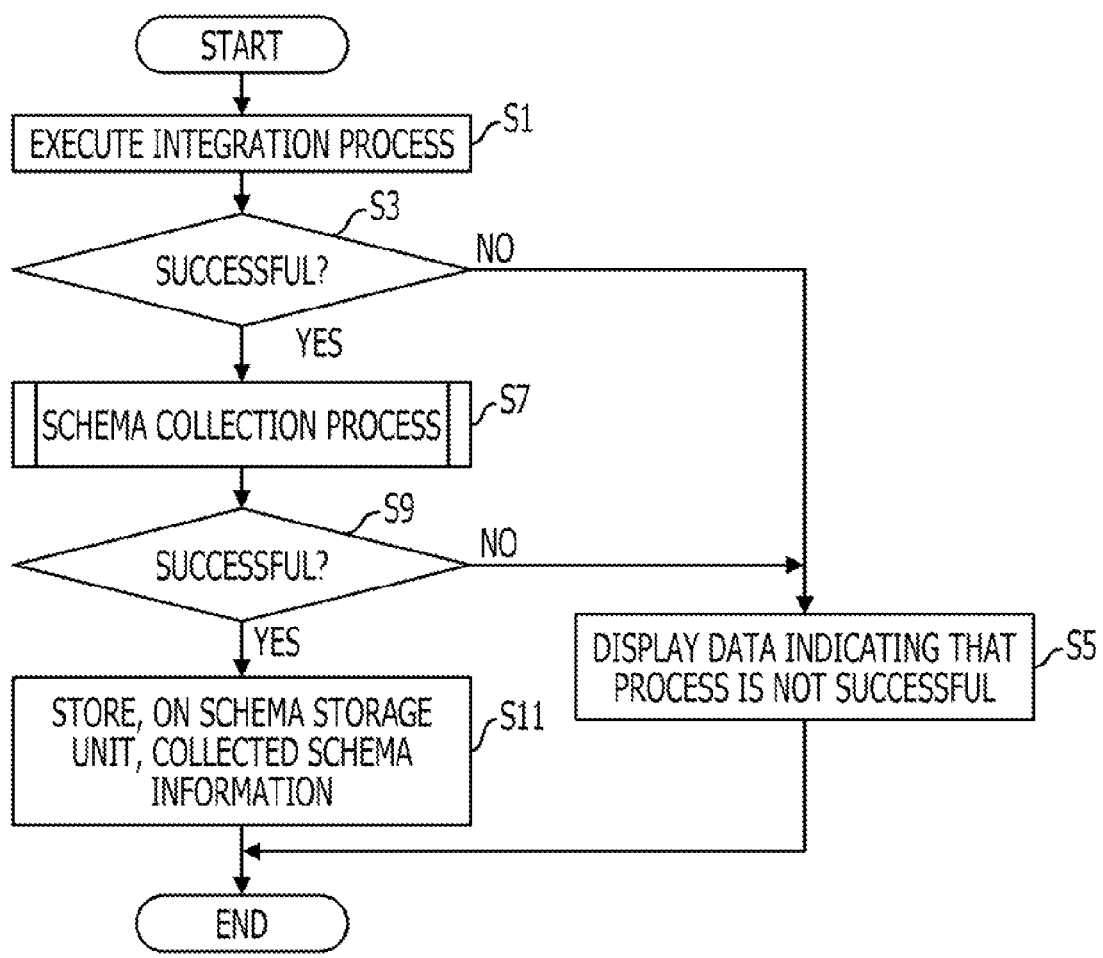
FIG. 11 is a flowchart illustrating a process performed at the first execution of an integration logic.

The information process executor 100 in the information integration apparatus 1 performs an integration process on data extracted from the DB 31 and the DB 33 in accordance with data stored on the metadata information storage unit 115 (S1 of FIG. 11). Operation S1 may be performed using related art techniques described in U.S. Pat. Nos. 6,014,670 and 6,339,775. More specifically, the extractor 101 extracts data from the DB 31 and the DB 33, and outputs the extracted data to the transformer 102. The transformer 102 transforms the data received from the extractor 101 in accordance with the data stored on the metadata information storage unit 115. If the data model, the data attribute, and the integration logic illustrated in FIGS. 9 and 10 are stored on the metadata information storage unit 115, the transformer 102 transforms the data type of the item values of the items "Employee No." and "EMPNO" from "Number" to "String." The transformer 102 also transforms the character code of the data retrieved from the DB 31 from "SJIS" to "UTF-16." The transformer 102 also merges the same items "Employee No." and "EMPNO." The transformer 102 also retrieves only data concerning "Employee No." "Name," and "Section." Through this process, the transformer 102 maps these data to the data model and data attribute 903. The transformer 102 outputs the transformed data to the register 103. The register 103 loads the received data on the DB 51.

The information process executor 100 determines whether the integration process is successful, e.g., whether the data has been transformed without any problem (S3). If the integration process is not successful (no loop from S3), the information process executor 100 drives the output unit 117 to cause the display unit data indicating that the process has failed (S5).

If the integration process is successful (yes loop from S3), the information process executor 100 instructs the schema collector unit 104 to collect the schema information. The schema collector unit 104 performs a schema collection process (S7).

Figure 12:
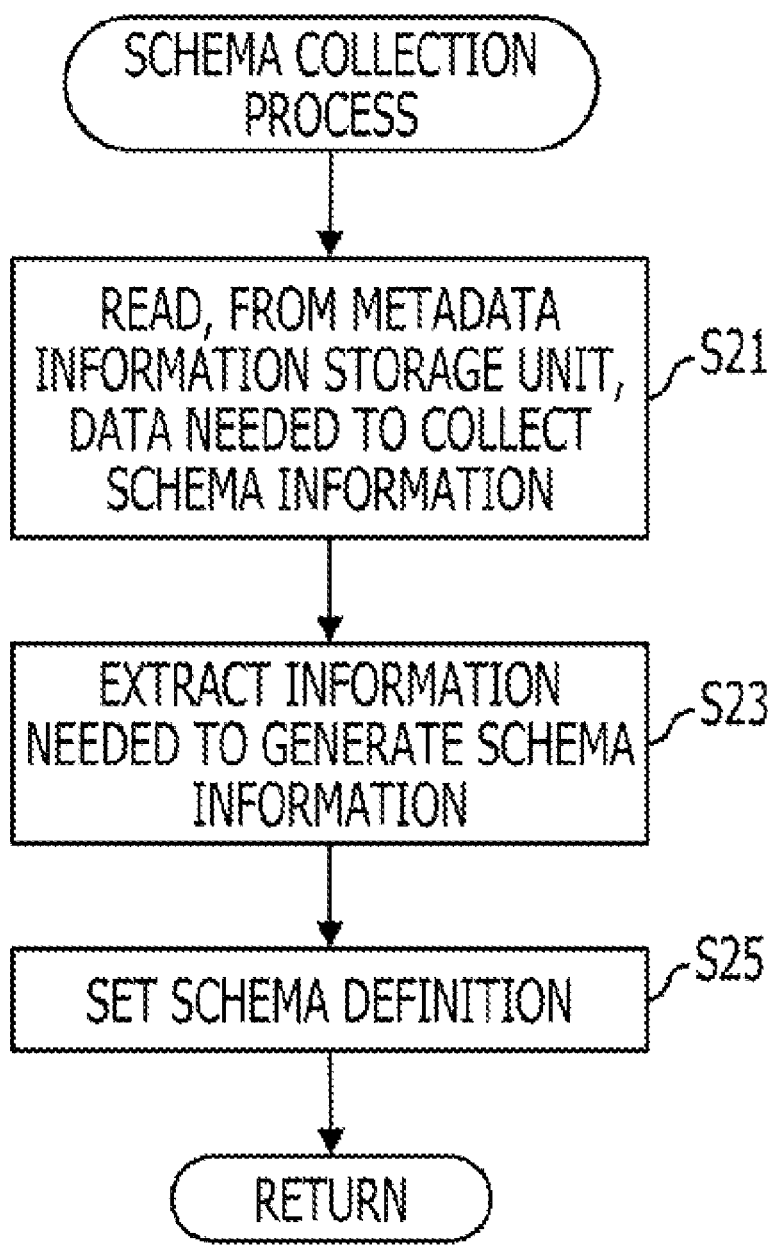
FIG. 12 is a flowchart illustrating a schema collection process.

The schema collection process is described below with reference to FIG. 12. The schema collector unit 104 reads from the metadata information storage unit 115 data needed to collect the schema information (for example, data related to the types of the DB 31 and the DB 33, and the connection to the DB 31 and the DB 33) (S21).

The schema collector unit 104 extracts information used to make connections to the DB 31 and the DB 33, and to generate the schema information (S23). The schema collector unit 104 generates a schema definition corresponding to the extracted information, and stores on the collected schema storage unit 106 the schema information including the extracted information and the schema definition (S25). Processing thus returns the previous routine.

Figure 13:
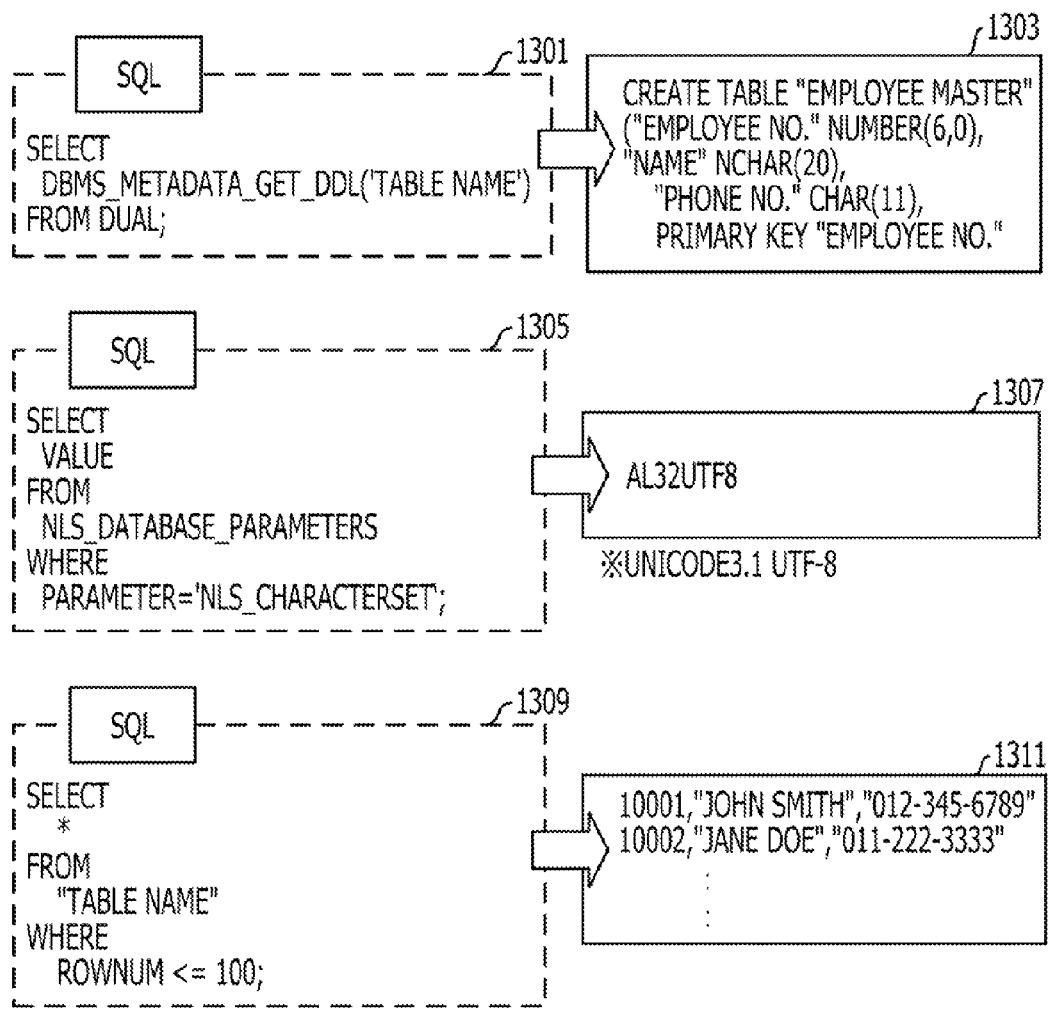
FIG. 13 illustrates a collection method of schema information.

The operations in S23 and S25 are described below with reference to FIGS. 13 and 14. The operation in S23 is described first with reference to FIG. 13. In operation S23, the schema collector unit 104 is connected to the DB 31 through procedural language (PL)/structured query language (SQL) interface. SQL1301 is executed to acquire data definition language (DDL) sentence of a table serving as a data extraction target. An execution result 1303 thus results. Information related to a data structure, such as the number of items, item names, and data types, is extracted. The schema collector unit 104 executes SQL1305 to acquire information of character codes, and thus acquires an execution result 1307. The schema collector unit 104 further executes SQL to extract leading 100 records of the data from a table serving as a data extraction target, and then acquires an execution result 1311. The extracted records are analyzed and information such as endian is then acquired.

In S25, the schema definition corresponding to extracted information is then generated. FIG. 14 illustrates the schema definition. As illustrated in FIG. 14, a schema definition 1401 is set on information 1403 retrieved from the DB 31, and a schema definition 1405 is set on information 1407 retrieved from the DB 33. The information 1403 retrieved from the DB 31 retains a description format of the DB 31, and is mapped to the schema definition 1401 through a description 1409 related to the data structure in the schema definition 1401. The same is true of the schema definition 1405 and the information 1407 retrieved from the DB 33.

Returning to FIG. 11, the schema collector unit 104 determines whether the schema collection process is successful (S9). If the schema collector unit 104 determines that the schema collection process is not successful (no loop from S9), the schema collector unit 104 drives the output unit 117 to cause the display unit to display data indicating that the process has failed (S5).

If the schema collector unit 104 determines that the schema collection process is successful (yes loop from S9), the schema collector unit 104 stores the schema information stored on the collected schema storage unit 106 onto the schema storage unit 105 (S11). Processing thus ends.

The schema storage unit 105 thus stores information related to a schema that has proved to be operative, and the information may be used when the schema is modified later.

A process to be performed in a repeated execution of the integration process subsequent to the integration process of FIG. 11 is described below with reference to FIGS. 15-29.

The information process executor 100 reads the data model, the data attribute, and the integration logic from the metadata information storage unit 115 and then stores the read data onto the execution data storage unit 116. The information process executor 100 instructs the schema collector unit 104 to collect the schema information. The schema collector unit 104 then performs the schema collection process (S31 of FIG. 15). The schema collection process has been described with reference to FIGS. 12-14. The schema collector unit 104 determines whether the schema collection process is successful (S33). If the schema collector unit 104 determines that the schema collection process is not successful (no loop from S33), processing proceeds to S59 of FIG. 29 via an exit point A. The schema collector unit 104 drives the output unit 117 to cause the display unit to display data indicating the process has failed (S59).

If the schema collection process is successful (yes from S33), the schema collector unit 104 compares the schema information stored on the schema storage unit 105 with the schema information stored on the collected schema storage unit 106, and determines whether the schema information has been modified (S35). For example, whether the schema information is modified or not is determined by calculating a difference between the two pieces of schema information. If it is determined that the schema is not modified (no loop from S37), processing proceeds to S49 of FIG. 29 via an exit point B.

If the schema has been modified (yes loop from S37), the schema collector unit 104 sets a modification flag in a memory unit such as a main memory (S39), and notifies the data model/data attribute corrector unit 107 that the schema has been modified. The data model/data attribute corrector unit 107 performs the data model/data attribute correction process on the schema information that has undergone a modification (S41). In the discussion that follows, the schema information that is stored on the collected schema storage unit 106 and that has undergone a modification is referred to as a post-modified schema, and the schema information that is stored on the schema storage unit 105 and that is prior to a modification is referred to as a pre-modified schema.

The data model/data attribute correction process is described with reference to FIGS. 16-19. The process to be described here is performed (a correction process of the data model) when the data type has been modified. The correction process of the data attribute is also performed in substantially the same process flow as described below.

Figure 16:
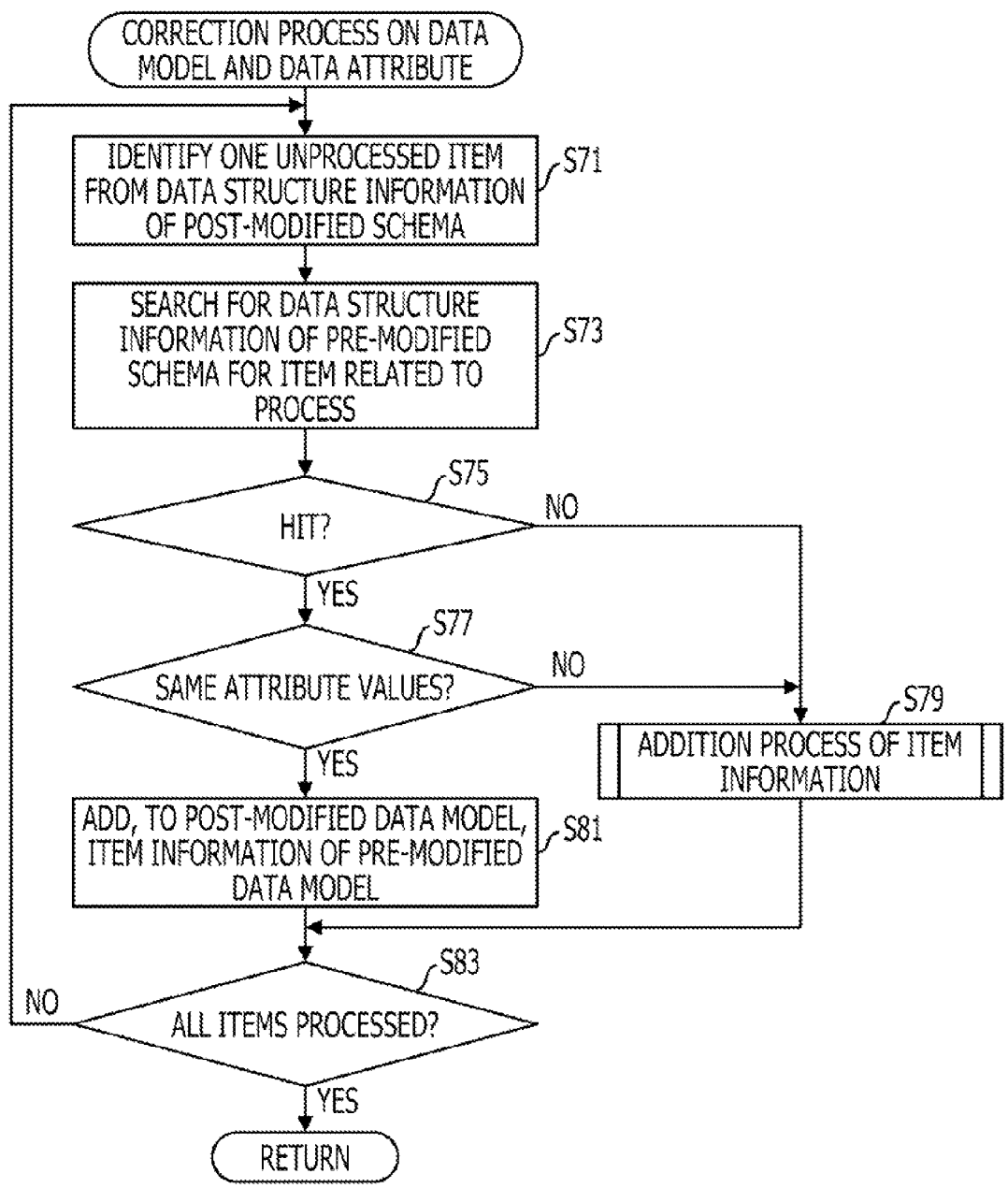
FIG. 16 is a flowchart illustrating a data model/data attribute correction process.

The data model/data attribute corrector unit 107 identifies one unprocessed item from data structure information of post-modified schema stored on the collected schema storage unit 106 (S71 of FIG. 16). The data model/data attribute corrector unit 107 then searches the data structure information of the pre-modified schema stored on the schema storage unit 105 for the item identified in S71 (in the discussion of FIGS. 16 and 17, the item identified in S71 is referred to as an "item related to the process") (S73).

The data model/data attribute corrector unit 107 determines whether the item related to the process is hit in the data structure information of the pre-modified schema (S75). If the data model/data attribute corrector unit 107 determines that the item related to the process is hit in the data structure information of the pre-modified schema (yes loop from S75), the data model/data attribute corrector unit 107 determines whether the attribute value of the item related to the process included in the data structure information of the post-modified schema is equal to the attribute value of the item related to the process included in the data structure information of the pre-modified schema (S77). If the two attribute values are equal to each other (yes loop from S77), the data model/data attribute corrector unit 107 adds item information of the data model stored on the metadata information storage unit 115 (hereinafter referred to as pre-modified data model) to the data model stored on the post-modified data storage unit 109 (the data model that is generated in the data model/data attribute correction process, and is hereinafter referred to as a post-modified data model) (S81).

Figure 18:
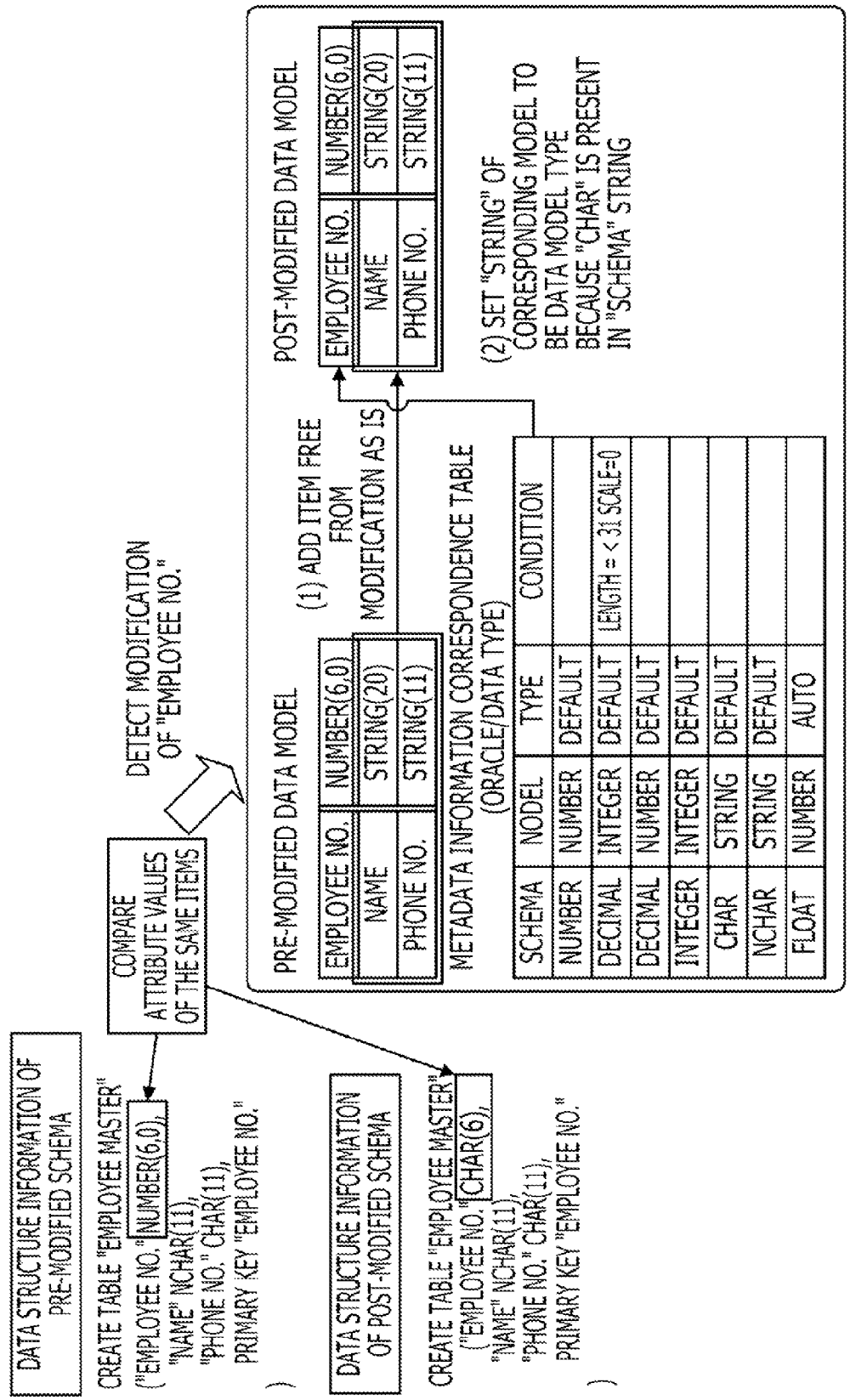
FIG. 18 illustrates the data model/data attribute correction process.

Operations in S71-S81 are described with reference to FIG. 18. In S71, items "Name" and "Phone number" in the data structure information of the post-modified schema data are identified. Items "Name" and "Phone number" are included in the data structure information of the pre-modified schema data. The attribute values of these items remain unchanged from the attribute values of the post-modified schema. The item information of the pre-modified data model is directly added to the post-modified data model. Item information "String(20)" is added to the item "Name," and item information "String(11)" is added to the item "Phone number."

Returning to FIG. 16, the data model/data attribute corrector unit 107 performs an item information addition process (S79). The item information addition process may be performed if an item related to the process is not hit in the data structure information of the pre-modified schema (no loop from S75), or if the attribute value of the item related to the process included in the data structure information of the post-modified schema is not equal to the attribute value of the item related to the process included in the data structure information of the pre-modified schema (no loop from S77). The item information addition process is described with reference to FIGS. 17-19.

Figure 17:
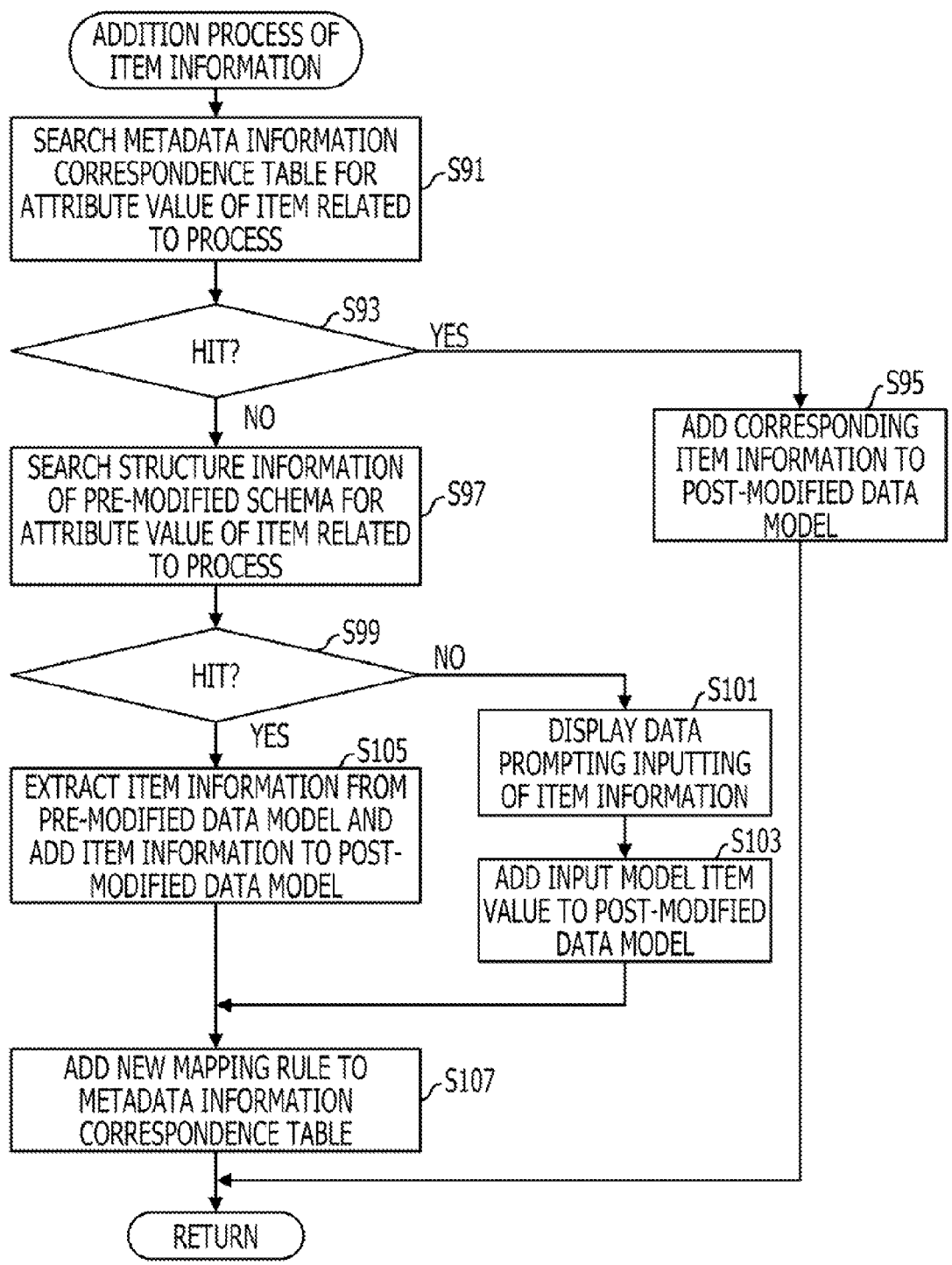
FIG. 17 is a flowchart illustrating an item information addition process.

The data model/data attribute corrector unit 107 searches the metadata information correspondence table (FIG. 3) stored on the correspondence table storage unit 108 for the attribute value of the item related to the process (S91 of FIG. 17). If the attribute value of the item related to the process is hit in the metadata information correspondence table (yes loop from S93), the data model/data attribute corrector unit 107 retrieves from the metadata information correspondence table the item information corresponding to the item related to the process, and adds the item information to the post-modified data model (S95).

An operation performed in S91-S95 is described with reference to FIG. 18. The item "Employee No." may be now identified in the data structure information of the post-modified schema in S71. The item "Employee No." is included in the data structure information of the pre-modified schema. The attribute value of the item is "NUMBER(6,0), and is different from the attribute value of the post-modified schema "CHAR(6)." The item information addition process (S79) is performed. If a search is made on the metadata information correspondence table according to the data type "CHAR" in S91, "CHAR" is hit in the "Schema" column. "String" at the "Model" column is added to the post-modified motor model.

If the item related to the process is not hit in the metadata information correspondence table FIG. 17 (no loop from S93), the data model/data attribute corrector unit 107 searches the data structure information of the pre-modified schema for the attribute value of the item related to the process (S97). If the attribute value of the item related to the process is hit (yes loop from S99), the data model/data attribute corrector unit 107 extracts the item information of the item corresponding to the attribute value from the pre-modified data model, and adds the attribute value of the item related to the process to the post-modified data model (S105). The data model/data attribute corrector unit 107 adds a new mapping rule to the metadata information correspondence table (S107).

Figure 19:
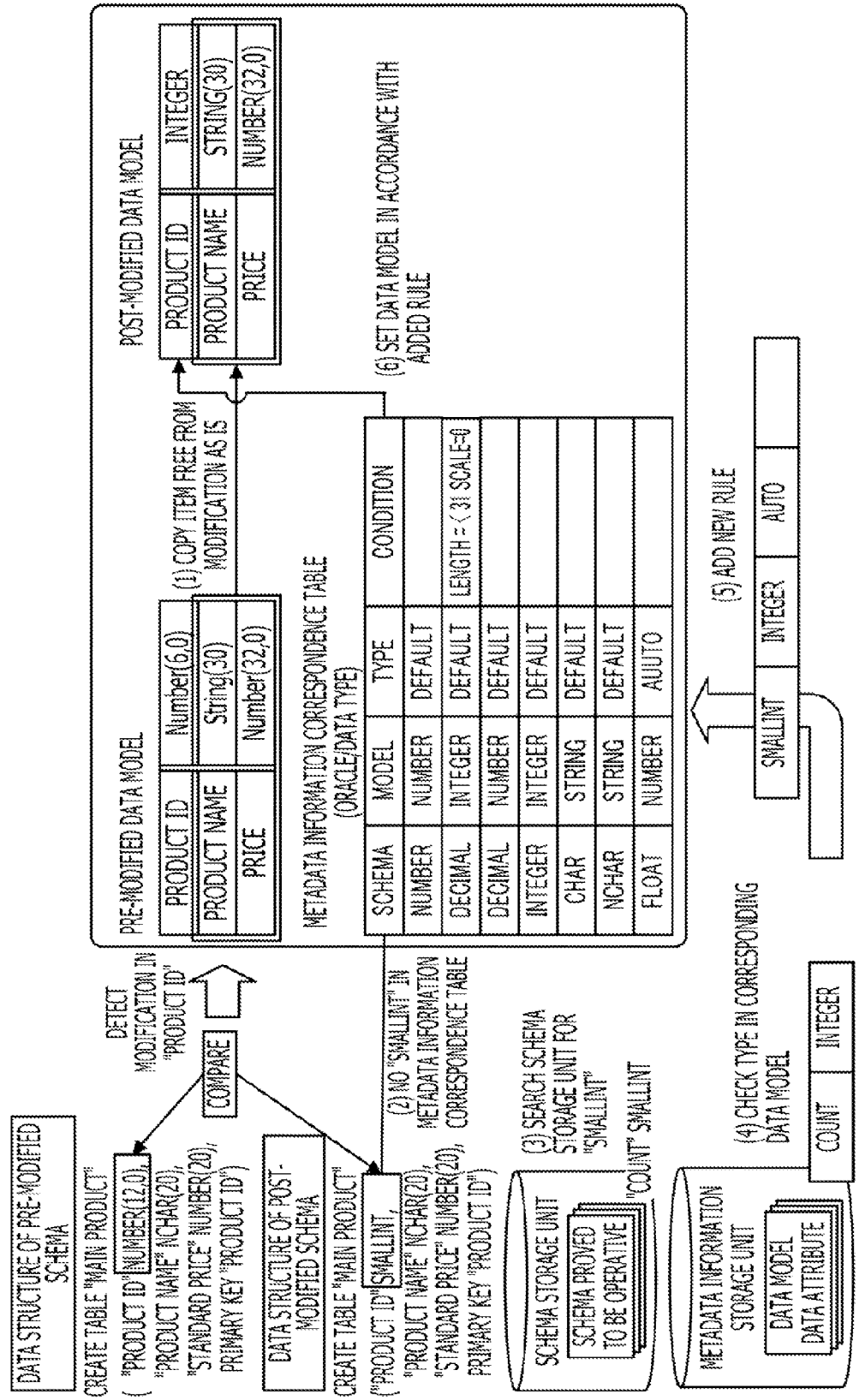
FIG. 19 illustrates the item information addition process.

An operation in S105 and S107 is described with reference to FIG. 19. In S71, an item "Product ID" may be identified in the data structure information of the post-modified schema. The item "Product ID" is included in the data structure information of the pre-modified schema. The attribute value of the item is "NUMBER(12,0)", and is different from the attribute value of the post-modified schema "SMALLINT." The item information addition process (S79) is thus performed. If a search is made on the metadata information correspondence table according to the data type "SMALLINT" in S91, "SMALLINT" is not hit in the "Schema" column. A search is made on the data structure information of the pre-modified schema according to "SMALLINT." If "SMALLINT" is hit, item information "Integer" corresponding to an item "Count" of "SMALLINT" is extracted from the pre-modified data model, and added to the post-modified data model. Stored in the metadata information correspondence table as a new mapping rule are "SMALLINT" in the "Schema" column, "Integer" in the "Model" column, and "auto" in the "Type" column. A mapping rule not found in the metadata information correspondence table is derived using the pre-modified schema and the pre-modified data model.

If the attribute value of the item related to the process is not hit in FIG. 17 (no loop from S99), the data model/data attribute corrector unit 107 drives the output unit 117 to cause the display unit to display data prompting the inputting of the item information (S101). If the item information is input, the input item information is added to the post-modified data model (S103). A new mapping rule is thus added to the metadata information correspondence table (S107). The item related to the process is stored at the "Schema" column, the input item information is stored in the "Model" column, and "user" is stored in the "Type" column. Processing then returns to the previous routine.

The above-described process automatically corrects the data model (and the data attribute) in response to the modification of the schema.

Returning to FIG. 15, the data model/data attribute corrector unit 107 determines whether the data model/data attribute correction process is successful (S43). If the data model/data attribute correction process is not successful (no loop from S43), processing proceeds to S59 via an exit point A. The data model/data attribute corrector unit 107 drives the output unit 117 to cause the display unit to display data indicating that the process has failed (S59).

If the data model/data attribute correction process is successful (yes loop from S43), the data model/data attribute corrector unit 107 instructs the integration logic corrector 110 to execute an integration logic correction process. The integration logic corrector 110 performs the integration logic correction process (S45). The integration logic correction process is described below with reference to FIGS. 20-28.

Figure 20:
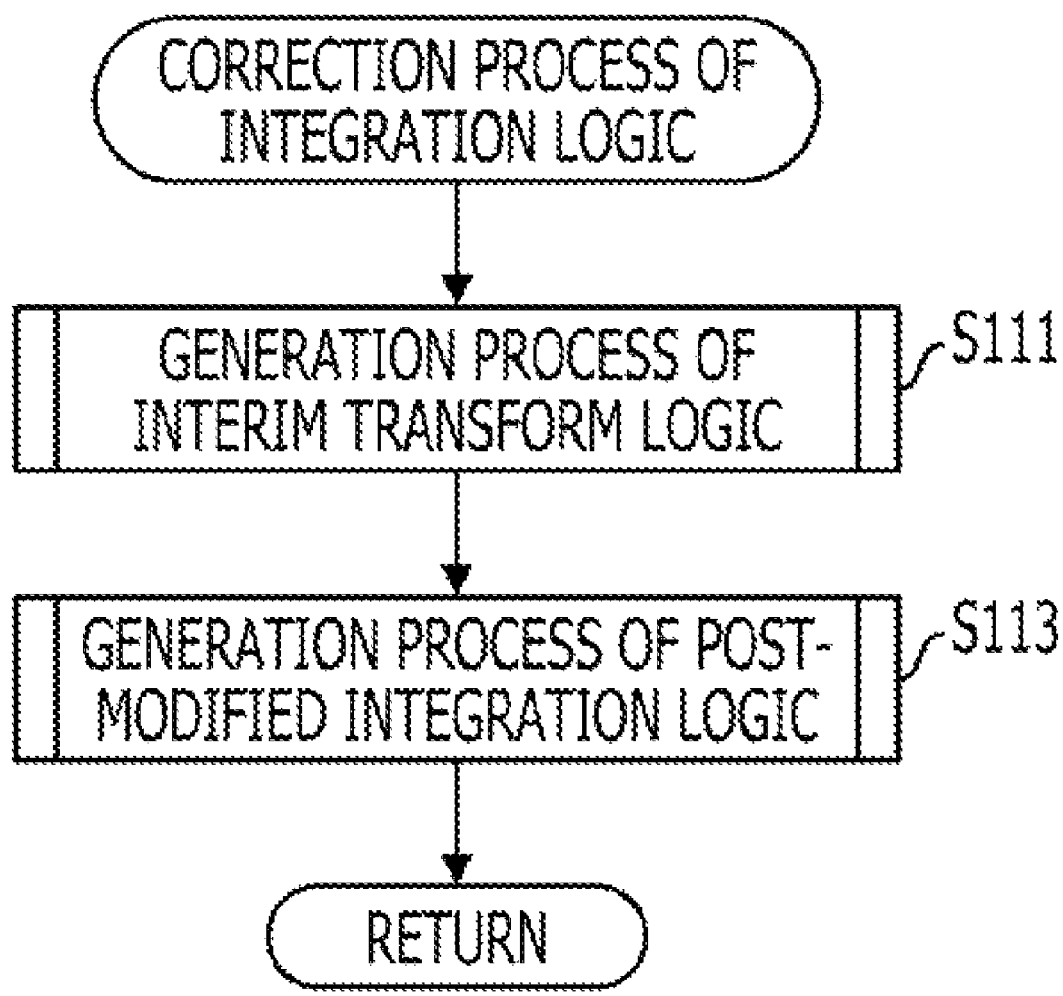
FIG. 20 is a flowchart illustrating an integration logic correction process.

The interim transform logic generator unit 111 in the integration logic corrector 110 performs an interim transform logic generation process (S111 of FIG. 20). The interim transform logic generation process is described below with reference to FIG. 21. In the discussion that follows, the interim transform logic generation process is performed on the data model. Similarly, the interim transform logic generation process may also be performed on the data attribute.

Figure 21:
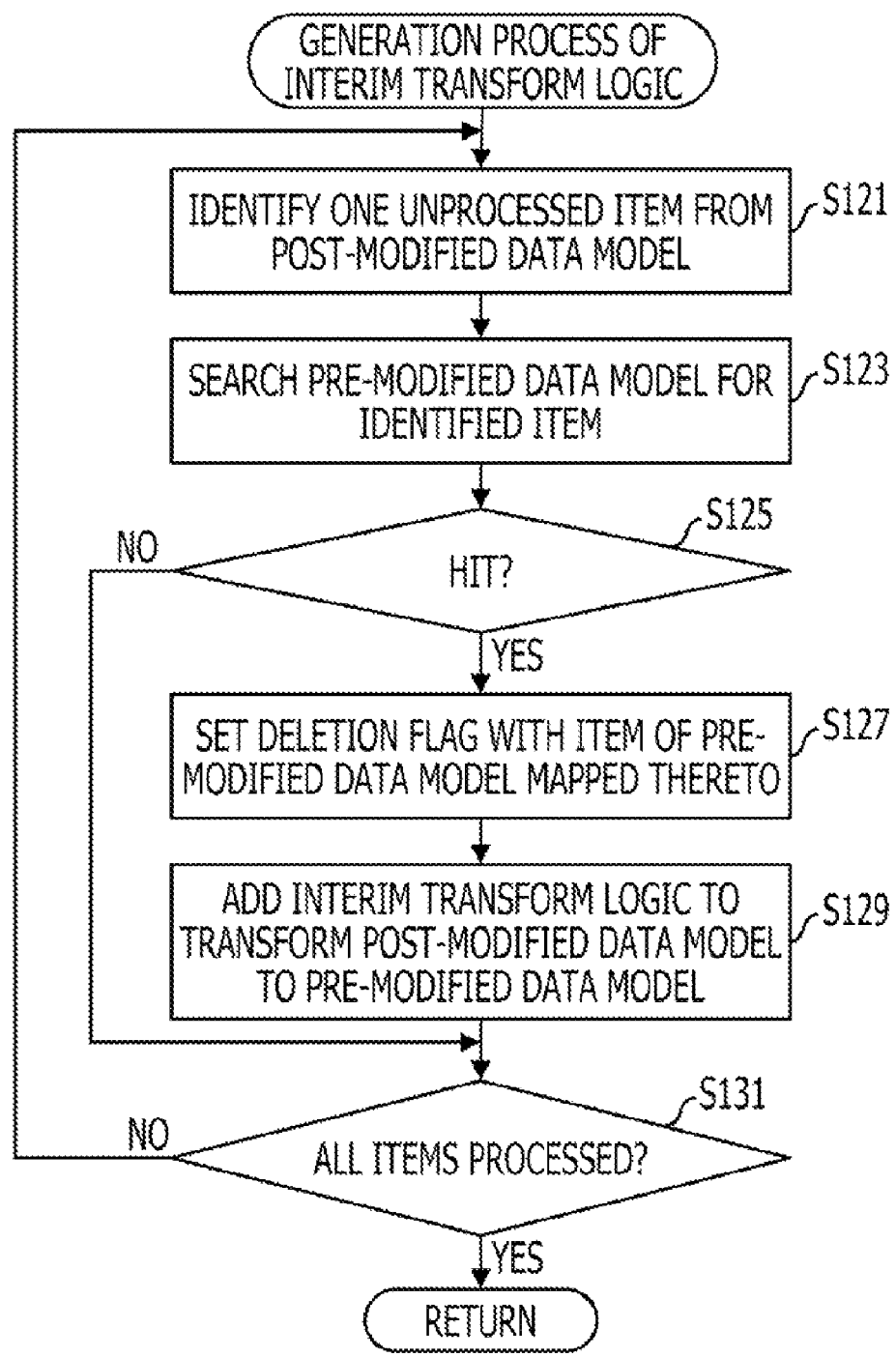
FIG. 21 is a flowchart of an interim transform logic generation process.

The interim transform logic generator unit 111 identifies one unprocessed item from the post-modified data model stored on the post-modified data storage unit 109 (S121 of FIG. 21). The one unprocessed item is referred to as the "item related to the process" in the discussion of FIG. 21.

The interim transform logic generator unit 111 searches the post-modified data model stored on the metadata information storage unit 115 for the item related to the process (S123). The interim transform logic generator unit 111 determines whether the item related to the process is hit in the pre-modified data model (S125). If the item related to the process is not hit (no loop from S125), processing proceeds to S131.

If the item related to the process is hit in the pre-modified data model (yes loop from S125), the interim transform logic generator unit 111 sets a deletion flag with the hit item related to the process mapped to the deletion flag in the pre-modified data model (S127).

The operation in S127 is described below with reference to FIG. 22. If the item related to the process is "EMPNO" or "DEPT," these items are also included in the pre-modified data model, and the deletion flag is set with the items "EMPNO" and "DEPT" mapped thereto in the pre-modified data model. On the other hand, the item "EXT" in the pre-modified data model is not an item included the post-modified data model, and no deletion flag is set. The deletion flag is used in the process flow of FIG. 27 as described below.

Returning to FIG. 21, the interim transform logic generator unit 111 generates an interim transform logic for transforming the post-modified data model to the pre-modified data model, and then stores the interim transform logic on the interim transform logic storage unit 112 (S129). The interim transform logic generator unit 111 determines whether all items have been processed (S131). If not all items have been processed (no loop from S131), processing returns to S121 to process the next item. If all items have been processed (yes loop from S131), processing returns to the previous routine.

Figure 23:
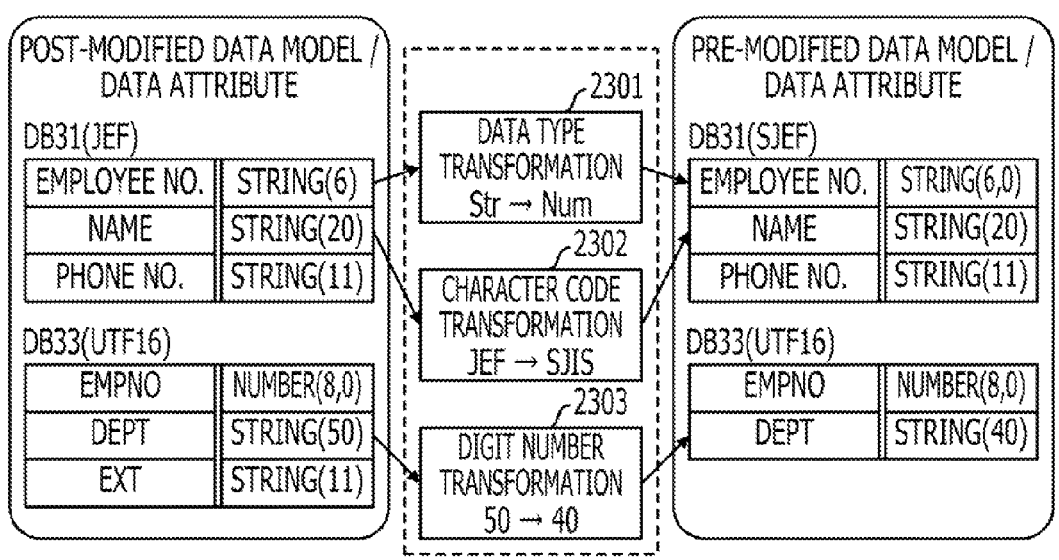
FIG. 23 illustrates the interim transform logic generation process.

The operation in S129 is described below with reference to FIG. 23. FIG. 23 illustrates not only the generation of the interim transform logic of the data model but also the generation of the interim transform logic of the data attribute. On the DB 31, the data type of the item "Employee No." is "String" in the post-modified data model but "Number" in the pre-modified data model. An interim transform logic 2301 is generated to transform the data type. On the DB 31, the character code is "JEF" in the post-modified data attribute but "SJIS" in the pre-modified data attribute. An interim transport logic 2302 is thus generated to transform the character code. On the DB 33, the digit number at the item "DEPT" is "50" in the post-modified data model but "40" in the pre-modified data model. An interim transform logic 2303 is generated to transform the digit number. In this way, the generated interim transform logics are stored on the interim transform logic storage unit 112.

The interim transform logics thus prepared allow a post-modified integration logic to be efficiently generated in accordance with the pre-modified integration logic.

Returning to FIG. 20, the integration logic generator unit 113 in the integration logic corrector 110 performs a post-modified integration logic generation process (S113). The post-modified integration logic generation process is described with reference to FIGS. 24-28. In the discussion that follows, the integration logic generation process is performed on the data model. The integration logic generation process may also be performed on the data attribute in a substantially similar fashion.

Figure 24:
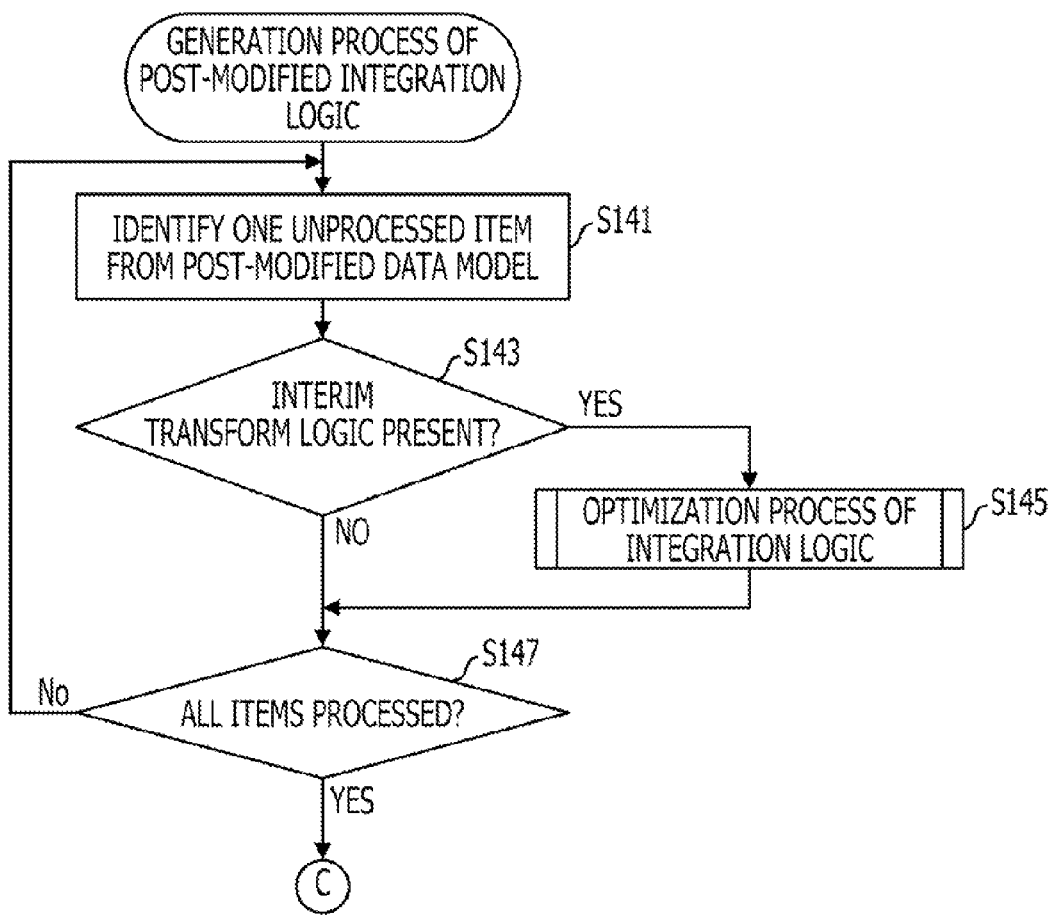
FIG. 24 is a flowchart illustrating a post-modified integration logic generation process.

The integration logic generator unit 113 identifies one unprocessed item from the post-modified data model stored on the post-modified data storage unit 109 (S141 of FIG. 24). The one unprocessed item is referred to as the "item related to the process" in the discussion of FIGS. 24 and 25. The integration logic generator unit 113 determines whether an interim transform logic of the item related to the process is stored on the interim transform logic storage unit 112 (S143). For example, the integration logic generator unit 113 determines whether the interim transform logic regarding the data type and type attribute (the digit number, null constraint, unique constraint) is stored on the interim transform logic storage unit 112.

If it is determined that an interim transform logic of the item related to the process is stored on the interim transform logic storage unit 112 (yes loop from S143), the integration logic generator unit 113 performs an integration logic optimization process (S145). The integration logic optimization process is described below with reference to FIGS. 25 and 26. The integration logic optimization process is performed on the data type herein.

The integration logic generator unit 113 determines whether the integration logic stored on the metadata information storage unit 115 (hereinafter referred to as a pre-modified integration logic) includes a transform logic of the data type of the item related to the process (S171).

If the transform logic of the data type is included (yes loop from S173), the integration logic generator unit 113 sets a pre-transform data type of the interim transform logic of the data type to be T1, and a post-transform data type of the transform logic of the data type included in the integration logic to be T2 (S175).

If it is determined that the data type transform logic is not included (no loop from S173), the integration logic generator unit 113 sets the pre-transform data type of the interim transform logic of the data type to be T1, and the post-transform data type of the transform logic of the data type included in the integration logic to be T2 (S177).

Figure 26:
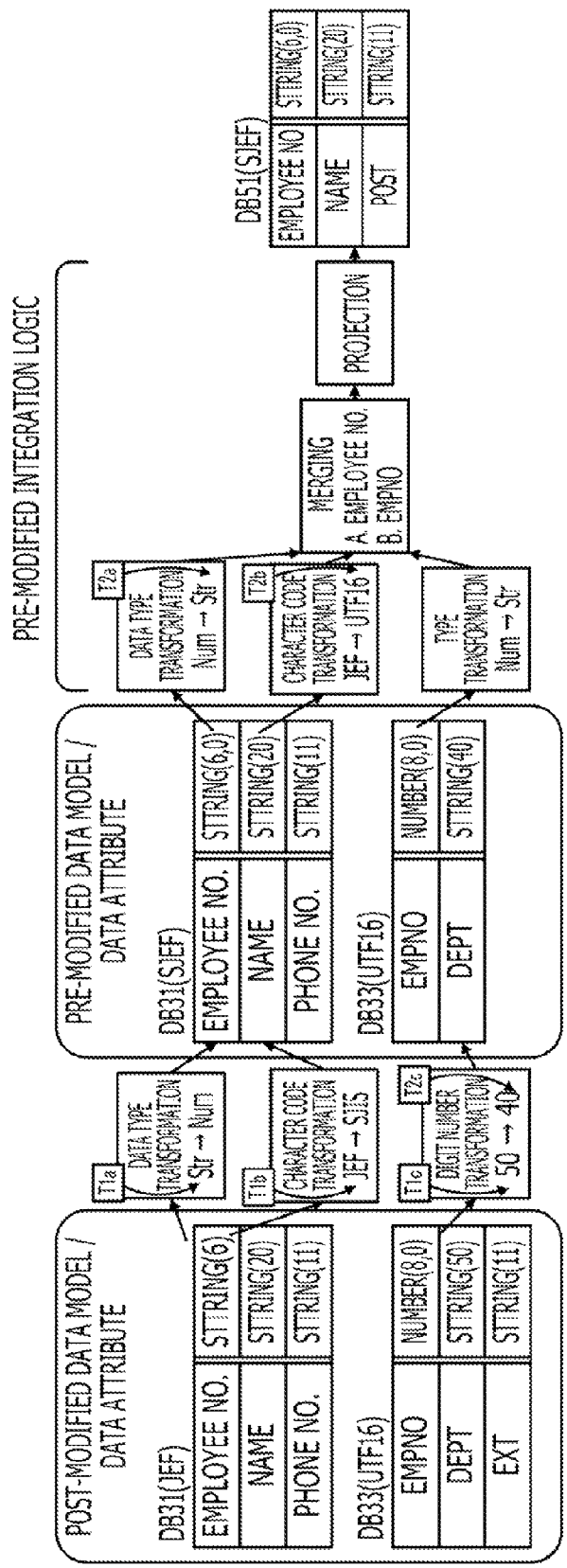
FIG. 26 illustrates the integration logic optimization process.

Referring to FIG. 26, the operations in S175 and S177 are described below. FIG. 26 illustrates the processing of not only the data type but also the data attribute. In FIG. 26, at the item "Employee No.", the interim transform logic of the data type is present, and the transform logic of the data type is also present in the pre-modified integration logic. The pre-transform data type "Str" is set to be T1a in the interim transform logic of the data type, and the post-transform data type "Str" is set to be T2a in the transform logic of the data in the integration logic. An interim transform logic is preset in the character code, and a transform logic of the character code is present in the pre-modified integration logic. The pre-transform character code "JEF" is set to be T1b in the interim transform logic of the character code and the post-transform character code "UTF-16" is set to be T2b in the transform logic of the character code included in the integration logic. An interim transform logic of the digit number is present at the item "DEPT," but no transform logic is present about the digit number in the integration logic. The pre-transform digit number "50" is set to be T1c in the interim transform logic of the digit number, and the post-transform digit number "40" is set to be T2c in the interim transform logic of the digit number.

Figure 25:
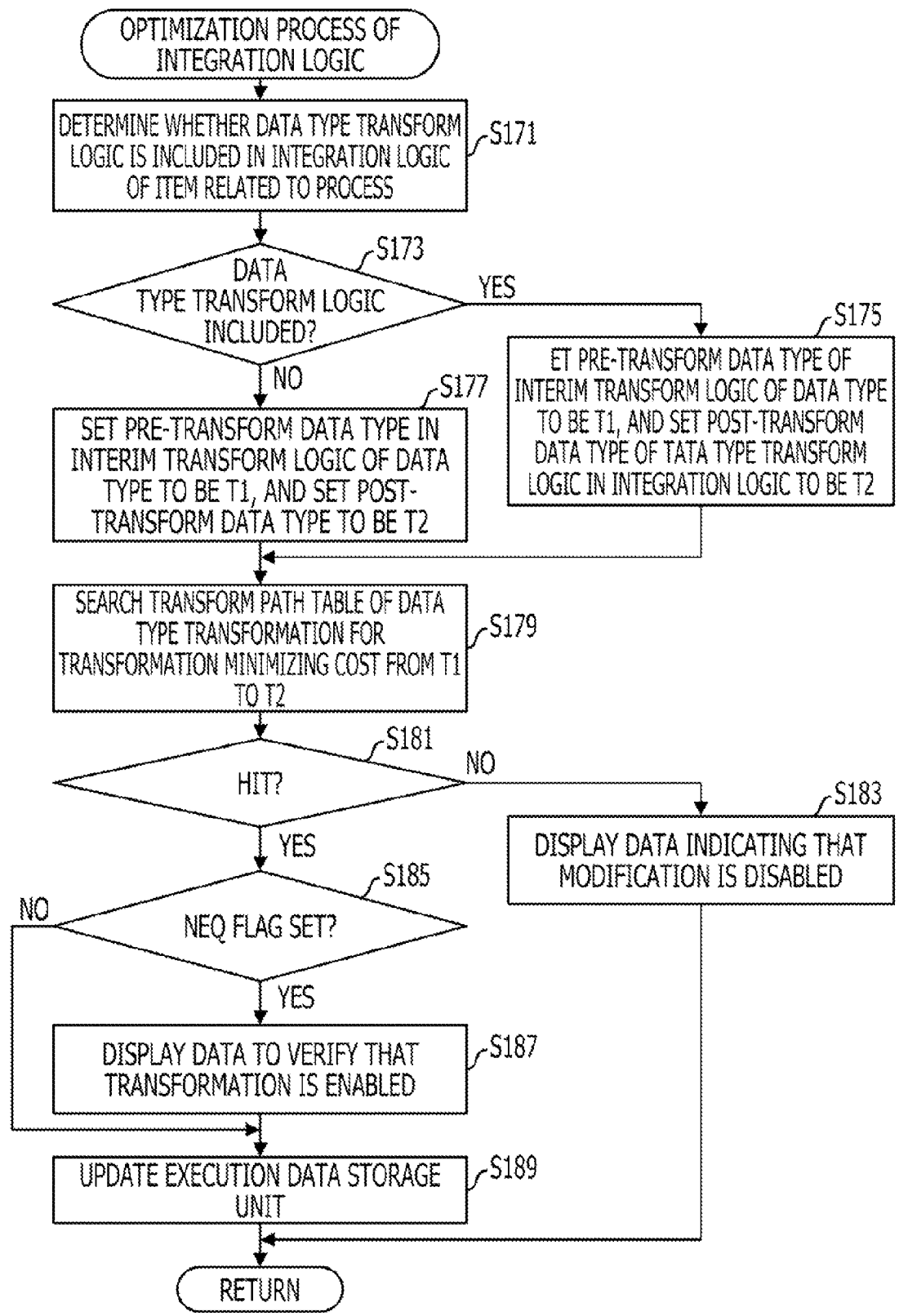
FIG. 25 is a flowchart illustrating an integration logic optimization process.

Subsequent to S175 and S177 in FIG. 25, the integration logic generator unit 113 searches a transform path table of data type transform for an optical transform path (S179). The optimum transform path minimizes a cost from T1 to T2.

Figure 28:
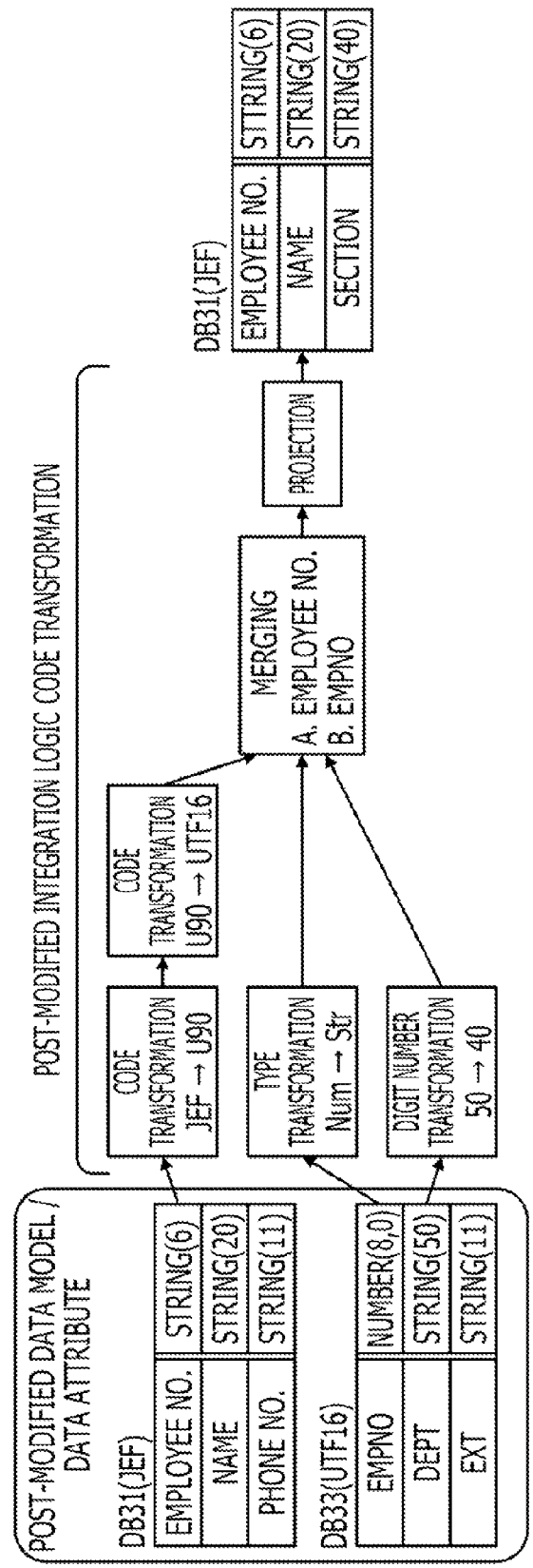
FIG. 28 illustrates a post-modified integration logic.

The operation S179 is described below with reference to FIG. 26. As illustrated in FIG. 26, the transformation from T1a(Str) to T1b(Str) indicates a transformation to the same value. The transformation, if not performed, leads to cost zero, and is optimum. The transformation from T2a(JEF) to T2b(UTF-16) is considered. The transform path table (FIG. 4) illustrates path (1) JEF→SJIS→UTF-16 (total cost:70), path (2) JEF→SJIS→UTF-8→UTF-16 (total cost: 100), path (3) JEF→U90→UTF-16 (total cost: 50), and path (4) JEF→U90→UTF-8→UTF-16 (total cost: 90). The path resulting in a minimum cost is path (3). The path (3) is an optimum path. The transformation from T1c(50) to T2c(40), if performed in accordance with the transform path table (FIG. 7), becomes optimum. An optimum path is selected from the interim transform logic and the pre-modified integration logic illustrated in FIG. 26 to generate a post-modified integration logic. The integration logic results as illustrated in FIG. 28.

If an optimum path resulting in a minimum cost from T1 to T2 is identified (yes loop from S181) in FIG. 25, the integration logic generator unit 113 determines whether an NEQ flag is set for the identified transform path in the transport path table storage unit 114 (S185). If the NEQ flag is set (yes loop from S185), the integration logic generator unit 113 drives the output unit 117 to cause the display unit to display data to determine whether transformation is enabled (S187). As illustrated in FIG. 26, the NEQ flag is set for the transformation from T1c(50) to T2c(40) in the transform path table (FIG. 7), and the operation in S185 is performed. If the NEQ flag is not set (no loop from S185), or if the administrator has placed a transformation instruction subsequent to the operation in S187, the integration logic generator unit 113 updates the execution data storage unit 116 with a newly generated transform logic of the data type (S189). More specifically, the newly generated data type transform logic is substituted for the pre-modified data type transform logic (S189). Processing returns to the previous routine.

If an optimum path resulting in a minimum cost from T1 to T2 is not identified (e.g., no transport path is present) (no loop from S181), the integration logic generator unit 113 drives the output unit 117 to cause the display unit to display data indicating that the modification is disabled (S183).

The above-described process generates the post-modified integration logic in a manner that reduces the cost of information integration.

Returning back to FIG. 24, the integration logic generator unit 113 determines whether all items have been processed (S147). If not all items are processed (no loop from S147), processing returns to S141 to process a next item. If all items have been processed (yes loop from S147), processing proceeds to S149 of FIG. 27 via an exit point C.

Figure 27:
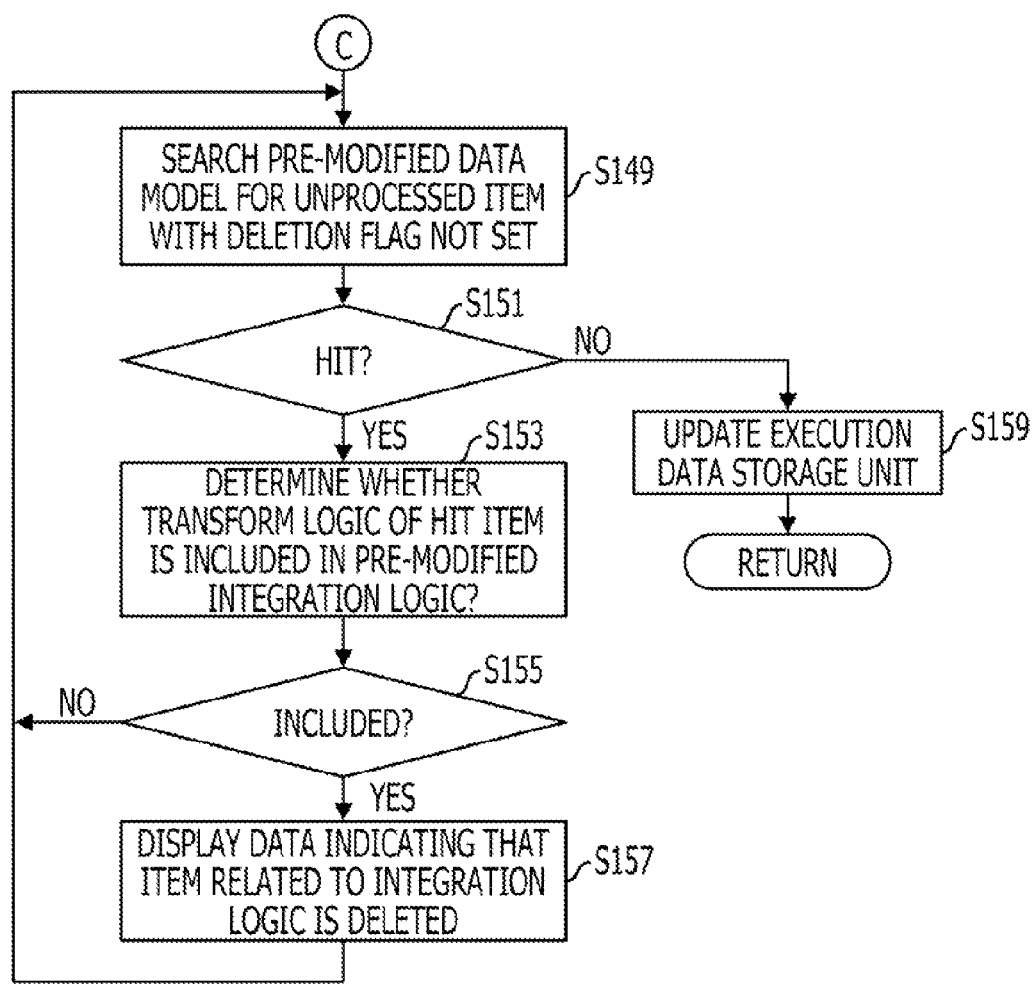
FIG. 27 is a flowchart illustrating the post-modified integration logic generation process.

Referring to FIG. 27, the integration logic generator unit 113 searches the pre-modified data model stored on the metadata information storage unit 115 for an unprocessed item having the deletion flag thereof not set (S149). If an unprocessed item having an unset deletion flag is not hit (no loop from S151), the integration logic generator unit 113 updates the execution data storage unit 116 with the newly generated post-modified data model (e.g., with the pre-modified data model substituted for by the post-modified data model). Processing returns to the previous routine. The integration logic correction process is thus complete, and processing returns to S47 of FIG. 15.

If an unprocessed item having an unset deletion flag is hit (yes loop from S151), the integration logic generator unit 113 determines whether the transform logic of the detected item is included in the integration logic stored on the metadata information storage unit 115 (S153). If it is determined that the transform logic of the detected item is not included in the integration logic stored on the metadata information storage unit 115 (no loop from S155), processing returns to S149. If it is determined that he transform logic of the detected item is included in the integration logic stored on the metadata information storage unit 115 (yes loop from S155), the integration logic generator unit 113 drives the output unit 117 to cause the display unit to display data indicating that the item related to the pre-modified integration logic is deleted in the post-modified data model (S157). Processing returns to S149.

The item having an unset deletion flag is an item present in the pre-modified data model but not present in the post-modified data model, in other words, is an item deleted from the post-modified data model. The transform logic of such an item, if present in the pre-modified integration logic, may affect the post-modified integration logic. To alert the administrator, the operation in S157 is performed.

The above-described process saves the administrator time for correcting the integration logic.

Figure 15:
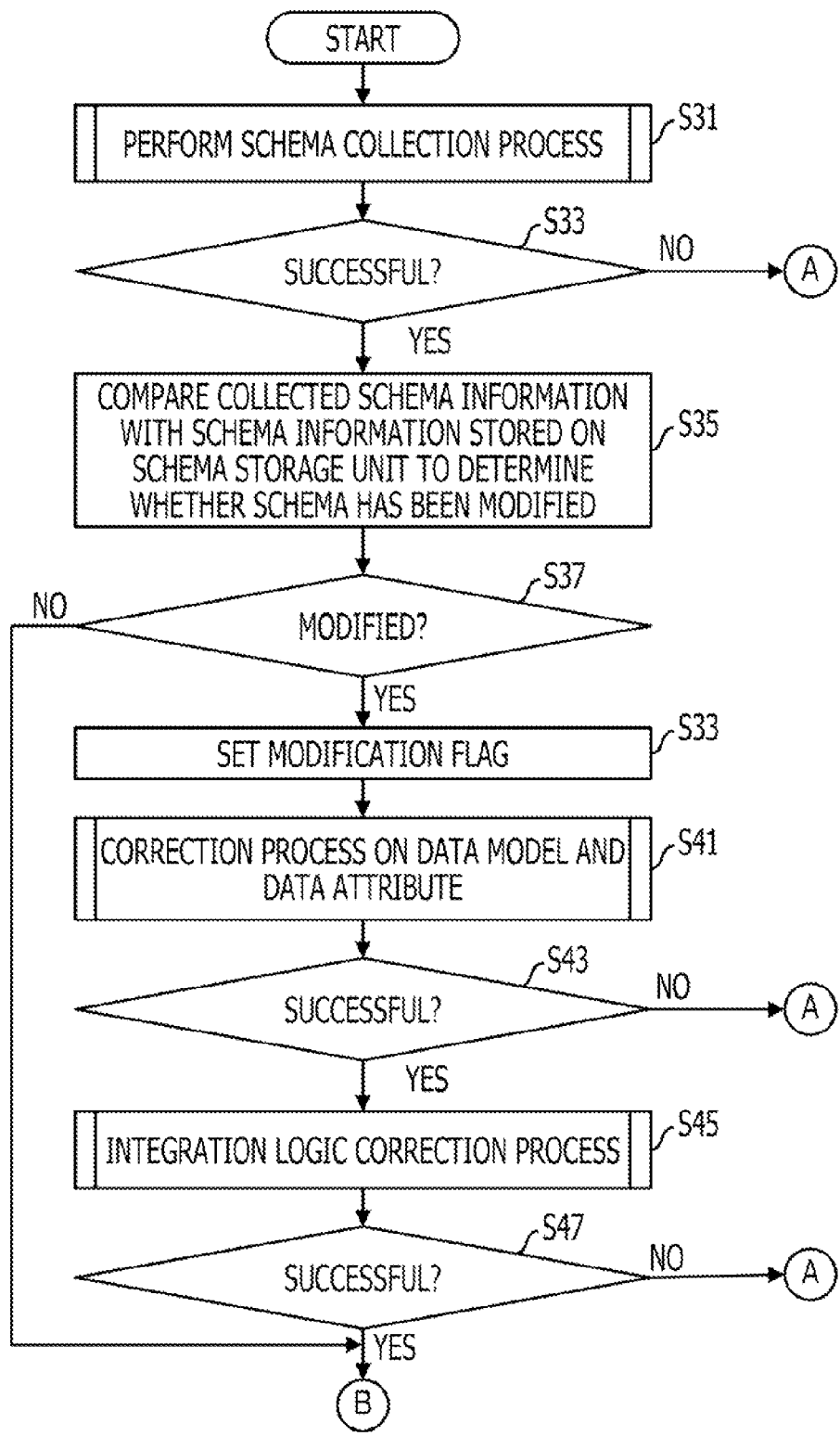
FIG. 15 is a flowchart illustrating a process performed at the execution of the integration logic.

Referring to FIG. 15, the integration logic corrector 110 then determines whether the integration logic correction process is successful (S47). If the integration logic correction process is not successful (no loop from S47), processing proceeds to S59 of FIG. 29 via an exit point A. The integration logic corrector 110 drives the output unit 117 to cause the display unit to display data indicating that the process has failed (S59). If it is determined that the integration logic correction process is successful (yes loop from S47), processing proceeds to S49 of FIG. 29 via an exit point B.

Figure 29:
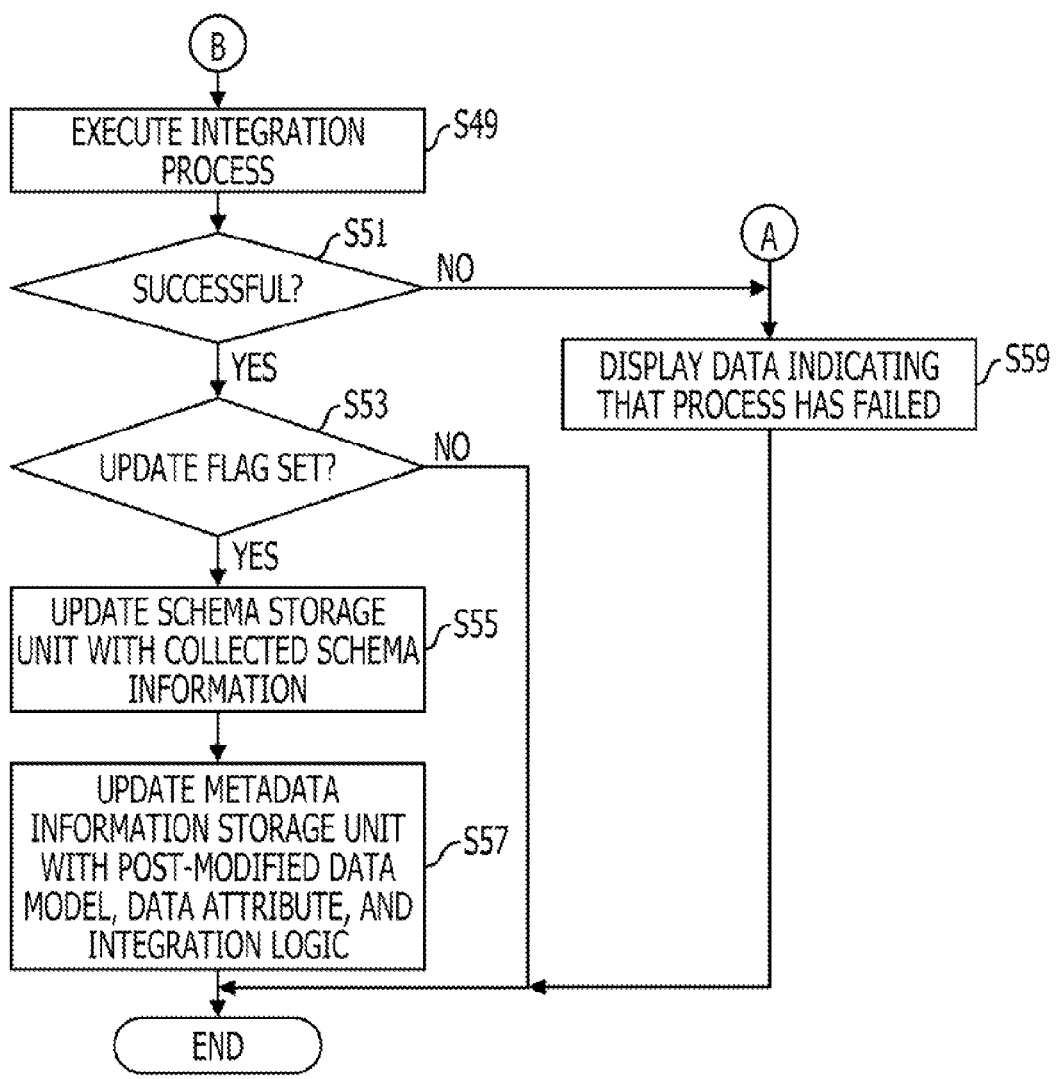
FIG. 29 is a flowchart illustrating a process performed at the execution of the integration logic.

Referring to FIG. 29, the information process executor 100 executes an integration process in accordance with the data model, the data attribute, and the integration logic stored on the execution data storage unit 116 (S49). The information process executor 100 then determines whether the integration process is successful (S51). If it is determined that the integration process is not successful (no loop from S51), the information process executor 100 drives the output unit 117 to cause the display unit to display data indicating that the process is not successful (S59).

If it is determined that the integration process is successful (yes loop from S51), the information process executor 100 determines whether a modification flag has been set (S53). If the modification flag has not been set (no loop from S53), processing ends.

If the modification flag has been set (yes loop from S53), the information process executor 100 updates the schema storage unit 105 with the post-modified schema stored on the collected schema storage unit 106 (S55). The information process executor 100 also updates the metadata information storage unit 115 with the data model, the data attribute, and the integration logic stored on the execution data storage unit 116 (S57). Processing thus ends.

If the metadata information (such as the data model, the data attribute, and the integration logic) needed in the updating of the schema of the database as an information source is automatically corrected as described above, the administrator is free from a correction operation, and operation costs of the system is reduced.

The embodiments of the technique have been discussed. The technique is not limited to the above embodiments. For example, the function blocks of the information integration apparatus 1 described above do not necessarily agree with the actual program module configuration.

The structures of the tables are described for exemplary purposes only, and are not necessarily arranged described above. In the process flows, the order of operations may be changed as long as the results remain unchanged. The operations may be executed in parallel.

Figure 30:
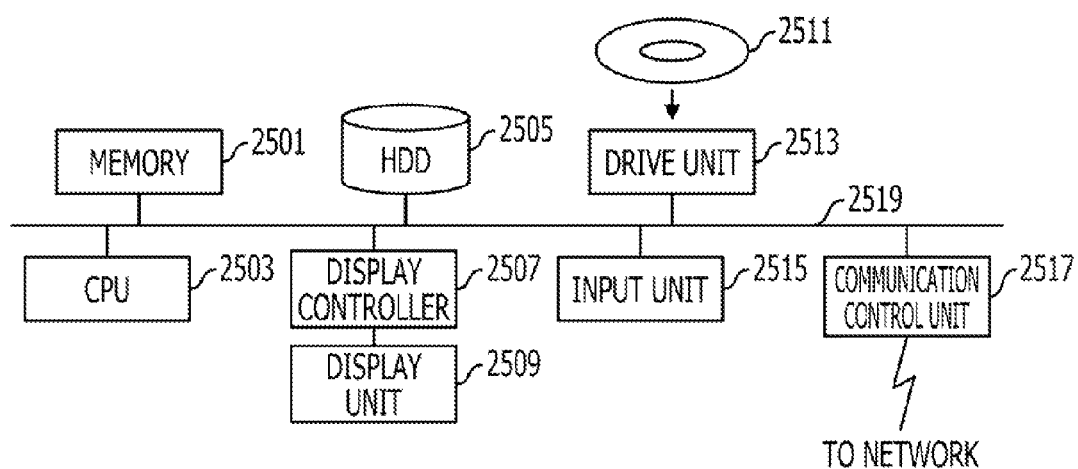
FIG. 30 is a function block diagram of a computer.

The information integration apparatus 1 described above is a computer. As illustrated in FIG. 30, the computer includes memory 2501, CPU 2503, hard disk drive (HDD) 2505, display controller 2507 connected to a display unit 2509, drive unit 2513 for a removable disk 2511, input unit 2515, communication control unit 2517 connected to a network, and bus 2519 interconnecting these elements. An operating system (OS) and an application program for executing the processes of the embodiments are stored on the HDD 2505. When the CPU 2503 executes the program, the programs are read from the HDD 2505 onto the memory 2501. The CPU 2503 controls the display controller 2507, the communication control unit 2517, and the drive unit 2513 as appropriate to cause these elements to perform the processes thereof. Interim process data is stored on the memory 2501, and if necessary, may also be stored on the HDD 2505. According to the embodiments of the technique, the application program for executing the above-described processes may be distributed in a stored state on the removable disk 2511, and then installed from the drive unit 2513 to the HDD 2505. The program may be installed onto the HDD 2505 via a network such as the Internet and the communication control unit 2517. The computer executes the above-described functions with hardware, such as the CPU 2503 and the memory 2501, and the OS and the application program operating in cooperation with each other.

The embodiments of the technique described above are summarized as below.

The information integration method is executed by the computer that transforms data extracted from an information source and loads the transformed data on a storage destination. The information integration method includes (A) a step of detecting a schema modification of an information source (such as a database or a file) by comparing first schema information acquired from the information source with second schema information acquired from the information source prior to modifying the first schema information, (B) a step of searching a correspondence table storage unit for an attribute value of an item related to the schema modification, the correspondence table storage unit storing the attribute value included in schema information and item information of a data model, with the attribute value mapped to the item information, (C) if the attribute value of the item related to the schema modification is hit in the correspondence table storage unit, a step of generating a post-modified data model, by correcting a pre-modified data model stored on a metadata information storage unit using the item information corresponding to the attribute value of the item related to the schema modification, the metadata information storage unit storing the pre-modified data model corresponding to the second schema information, and of storing the post-modified data model on a storage device, and (D) a step of generating a post-modified integration logic and storing the post-modified integration logic on the metadata information storage unit, the post-modified integration logic transforming the post-modified data model stored on the storage device into a data model corresponding to the storage destination.

Even if the schema of the information source is modified in this arrangement, the administrator is free from a correction operation that is needed in the modification. Operation costs of the system are reduced. Substantially the same process is performed on the data model and the data attribute. The data model represents a data structure such as a data type and a data length, and the data attribute represents characteristics of data, other than the data structure, such as the character code and the endian.

A system of the information source or the storage destination is typically a database. The system may be a file such as comma separated values (CSV) or extensible markup language (XML). The discussion of the embodiments is based on the premise that the information source system and the storage destination system are databases. Even if the system is a file, the technique described herein is applicable by constructing information corresponding to the schema of the database through a method of data profiling (analysis).

In case that an attribute value of the item related to the schema modification is not detected in the correspondence table storage unit, the information integration method may further include the following steps. The information integration method may include a step of determining whether the attribute value of the item related to the schema modification is included in the second schema information if the attribute value of the item related to the schema modification is not hit in the correspondence table storage unit, a step of identifying an item corresponding to the attribute value of the item related to the schema modification from the second schema information if the attribute value of the item related to the schema modification is included in the second schema information, and a step of extracting item information of the identified item from the pre-modified data model, generating the post-modified data model by correcting the pre-modified data model using the item information, and storing the post-modified data model on the storage device. A mapping rule not stored on the correspondence table storage unit is thus derived using the second schema information and the pre-modified data model.

The information integration method may further include a new rule generation step of storing on the correspondence table storage unit the attribute value of the item related to the schema modification and the item information extracted in the extracting step with the attribute value mapped to the item information. The newly derived mapping rule may be used next time.

The metadata information storage unit stores a pre-modified integration logic. The pre-modified integration logic transforms the pre-modified data model into a data model corresponding to the storage destination. The information integration method described above may further include a step of generating an interim transform logic, the interim transform logic transforming the post-modified data model stored on the storage device into the pre-modified data model stored on the metadata information storage unit, and a step of generating the post-modified integration logic, the post-modified integration logic transforming the post-modified data model into the data model corresponding to the storage destination in accordance with the generated interim transform logic and the pre-modified integration logic stored on the metadata information storage unit. The post-modified integration logic is efficiently generated using the pre-modified integration logic.

The information integration method may further include a step of identifying a transform path using data stored on a transform path table, the transform path minimizing the cost needed to transform the post-modified data model to a data model corresponding to the storage destination, the transform path table storing data of the transform path and the cost for transformation with the data mapped to the cost, and a step of generating the post-modified integration logic in a manner such that the transformation is performed over the identified transform path. With this arrangement, the cost for the information integration process is minimized after the integration logic is modified.

A program for causing a computer to perform the process of the information integration method is produced. The program may be stored on one of computer-readable recording media including a flexible disk, a CD-ROM, an optical disk, a semiconductor memory, and a hard disk, or may be stored on a storage device. Interim process results may be temporarily stored on a storage device such as a main memory.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A non-transitory computer-readable recording medium storing an information integration program, the information integration program causing a computer to transform data extracted from an information source and load the transformed data onto a storage destination, the information integration program causing the computer to perform operations comprising:

detecting a schema modification of the information source by comparing first schema information acquired from the information source with second schema information acquired from the information source prior to modifying the first schema information;

searching a correspondence table storage unit for an attribute value of an item related to the schema modification, the correspondence table storage unit storing the attribute value included in schema information and item information in a data model, with the attribute value mapped to the item information;

generating a post-modified data model by correcting a pre-modified data model stored on a metadata information storage unit using the item information corresponding to the attribute value of the item related to the schema modification when the attribute value of the item related to the schema modification is hit in the correspondence table storage unit, the metadata information storage unit storing the pre-modified data model corresponding to the second schema information;

storing the post-modified data model on a storage device; and generating a post-modified integration logic and storing the post-modified integration logic on the metadata information storage unit, the post-modified integration logic transforming the post-modified data model stored on the storage device into a data model corresponding to the storage destination.

2. The non-transitory computer-readable recording medium according to claim 1, wherein the information integration program causes the computer to perform further operations comprising:

determining whether the attribute value of the item related to the schema modification is included in the second schema information when the attribute value of the item related to the schema modification is not hit in the correspondence table storage unit;

identifying an item corresponding to the attribute value of the item related to the schema modification from the second schema information when the attribute value of the item related to the schema modification is included in the second schema information; and extracting item information of the identified item from the pre-modified data model, generating the post-modified data model by correcting the pre-modified data model using the item information, and storing the post-modified data model on the storage device.

3. The non-transitory computer-readable recording medium according to claim 2, wherein the information integration program causes the computer to perform further operations comprising:
storing the attribute value of the item related to the schema modification and the item information extracted in the extracting with the attribute value mapped to the item information.

4. The non-transitory computer-readable recording medium according to claim 1, wherein the information integration program causes the computer to perform further operations comprising:
storing a pre-modified integration logic on the metadata information storage unit, the pre-modified integration logic transforming the pre-modified data model into a data model corresponding to the storage destination;
generating an interim transform logic, the interim transform logic transforming the post-modified data model stored on the storage device into the pre-modified data model stored on the metadata information storage unit; and
generating the post-modified integration logic, the post-modified integration logic transforming the post-modified data model into the data model corresponding to the storage destination in accordance with the generated interim transform logic and the pre-modified integration logic stored on the metadata information storage unit.

5. The non-transitory computer-readable recording medium according to claim 4, wherein the information integration program causes the computer to perform further operations comprising:
identifying a transform path using data stored on a transform path table, the transform path minimizing a cost needed to transform the post-modified data model to a data model corresponding to the storage destination, the transform path table storing data of the transform path and the cost for transformation with the data mapped to the cost, and generating the post-modified integration logic in a manner such that the transformation is performed over the identified transform path.

6. An information integration apparatus for transforming data extracted from an information source and loading the transformed data onto a storage destination, comprising:
a correspondence table storage unit to store an attribute value included in schema information and item information of a data model with the attribute value mapped to the item information;
a metadata information storage unit to store a pre-modified data model corresponding to first schema information acquired from the information source;
a schema collector unit to detect a schema modification of the information source by comparing the first schema information with second schema information acquired from the information source subsequent to modifying the first schema information;
a data model corrector unit to search the correspondence table storage unit for an attribute value of an item related to the schema modification, generating a post-modified data model when the attribute value of the item related to the schema modification is hit, by correcting the pre-modified data model stored on the metadata information storage unit using the item information corresponding to the attribute value of the item related to the schema modification; and a generating unit to generate a post-modified integration logic and store the post-modified integration logic on the metadata information storage unit, the post-modified integration logic transforming the generated post-modified data model into a data model corresponding to the storage destination.

7. The information integration apparatus according to claim 6, further comprising:
a determining unit to determine whether the attribute value of the item related to the schema modification is included in the second schema information when the attribute value of the item related to the schema modification is not hit in the correspondence table storage unit;
an identifying unit to identify an item corresponding to the attribute value of the item related to the schema modification from the second schema information when the attribute value of the item related to the schema modification is included in the second schema information; and
an extracting unit to extract item information of the identified item from the pre-modified data model, generating the post-modified data model by correcting the pre-modified data model using the item information, and storing the post-modified data model on the storage device.

8. The information integration apparatus according to claim 7, further comprising:
an attribute value storage unit to store the attribute value of the item related to the schema modification and the item information extracted in the extracting with the attribute value mapped to the item information.

9. The information integration apparatus according to claim 6, wherein the metadata information storage unit stores a pre-modified integration logic, the pre-modified integration logic transforming the pre-modified data model into a data model corresponding to the storage destination,
the generating unit generates an interim transform logic, the interim transform logic transforming the post-modified data model stored on the storage device into the pre-modified data model stored on the metadata information storage unit, and
the generating unit generates the post-modified integration logic, the post- modified integration logic transforming the post-modified data model into the data model corresponding to the storage destination in accordance with the generated interim transform logic and the pre-modified integration logic stored on the metadata information storage unit.

10. The information integration apparatus according to claim 9, further comprising:
a path identifying unit to identify a transform path using data stored on a transform path table, the transform path minimizing a cost needed to transform the post-modified data model to a data model corresponding to the storage destination, the transform path table storing data of the transform path and the cost for transformation with the data mapped to the cost, and generating the post-modified integration logic in a manner such that the transformation is performed over the identified transform path.

11. An information integration method performed by a computer that transforms data extracted from an information source and loads the transformed data onto a storage destination, the information integration method comprising:
detecting a schema modification of the information source by comparing first schema information acquired from the information source with second schema information acquired from the information source prior to modifying the first schema information;

searching a correspondence table storage unit for an attribute value of an item related to the schema modification, the correspondence table storage unit storing the attribute value included in schema information and item information of a data model, with the attribute value mapped to the item information;

generating a post-modified data model by correcting a pre-modified data model stored on a metadata information storage unit using the item information corresponding to the attribute value of the item related to the schema modification when the attribute value of the item related to the schema modification is hit in the correspondence table storage unit, the metadata information storage unit storing the pre-modified data model corresponding to the second schema information, and storing the post-modified data model on a storage device; and generating a post-modified integration logic and storing the post-modified integration logic on the metadata information storage unit, the post-modified integration logic transforming the post-modified data model stored on the storage device into a data model corresponding to the storage destination.

12. The information integration method according to claim 11, further comprising:

determining whether the attribute value of the item related to the schema modification is included in the second schema information when the attribute value of the item related to the schema modification is not hit in the correspondence table storage unit;

identifying an item corresponding to the attribute value of the item related to the schema modification from the second schema information when the attribute value of the item related to the schema modification is included in the second schema information; and extracting item information of the identified item from the pre-modified data model, generating the post-modified data model by correcting the pre-modified data model using the item information, and storing the post-modified data model on the storage device.

13. The information integration method according to claim 12, further comprising:

storing the attribute value of the item related to the schema modification and the item information extracted in the extracting with the attribute value mapped to the item information.

14. The information integration method according to claim 11, further comprising:

storing a pre-modified integration logic on the metadata information storage unit, the pre-modified integration logic transforming the pre-modified data model into a data model corresponding to the storage destination;

generating an interim transform logic, the interim transform logic transforming the post-modified data model stored on the storage device into the pre-modified data model stored on the metadata information storage unit; and generating the post-modified integration logic, the post-modified integration logic transforming the post-modified data model into the data model corresponding to the storage destination in accordance with the generated interim transform logic and the pre-modified integration logic stored on the metadata information storage unit.

15. The information integration method according to claim 14, further comprising:

identifying a transform path using data stored on a transform path table, the transform path minimizing a cost needed to transform the post-modified data model to a data model corresponding to the storage destination, the transform path table storing data of the transform path and the cost for transformation with the data mapped to the cost, and generating the post-modified integration logic in a manner such that the transformation is performed over the identified transform path.

16. An information integration apparatus for transforming data extracted from an information source and loading the transformed data onto a storage destination, comprising:

a memory that stores an attribute value included in schema information and item information of a data model with the attribute value mapped to the item information, and stores a pre-modified data model corresponding to first schema information acquired from the information source; and a processor that executes a procedure, the procedure including:

detecting a schema modification of the information source by comparing the first schema information with second schema information acquired from the information source subsequent to modifying the first schema information;

searching the memory for an attribute value of an item related to the schema modification, generating a post-modified data model when the attribute value of the item related to the schema modification is hit, by correcting the pre- modified data model stored on the memory using the item information corresponding to the attribute value of the item related to the schema modification; and generating a post-modified integration logic and storing the post- modified integration logic on the memory, the post-modified integration logic transforming the generated post-modified data model into a data model corresponding to the storage destination.

17. The information integration apparatus according to claim 16, wherein the procedure further comprises:

determining whether the attribute value of the item related to the schema modification is included in the second schema information when the attribute value of the item related to the schema modification is not hit in the memory;

identifying an item corresponding to the attribute value of the item related to the schema modification from the second schema information when the attribute value of the item related to the schema modification is included in the second schema information; and extracting item information of the identified item from the pre-modified data model, generating the post-modified data model by correcting the pre-modified data model using the item information, and storing the post-modified data model on the storage device.

18. The information integration apparatus according to claim 17, wherein the procedure further comprises:

storing the attribute value of the item related to the schema modification and the item information extracted in the extracting with the attribute value mapped to the item information.

19. The information integration apparatus according to claim 16, wherein the procedure further comprises:

storing a pre-modified integration logic on the memory, the pre-modified integration logic transforming the pre-modified data model into a data model corresponding to the storage destination;

generating an interim transform logic, the interim transform logic transforming the post-modified data model stored on the storage device into the pre-modified data model stored on the memory; and generating the post-modified integration logic, the post-modified integration logic transforming the post-modified data model into the data model corresponding to the storage destination in accordance with the generated interim transform logic and the pre-modified integration logic stored on the memory.

20. The information integration apparatus according to claim 19, wherein the procedure further comprises:

identifying a transform path using data stored on a transform path table, the transform path minimizing a cost needed to transform the post-modified data model to a data model corresponding to the storage destination, the transform path table storing data of the transform path and the cost for transformation with the data mapped to the cost, and generating the post-modified integration logic in a manner such that the transformation is performed over the identified transform path.

* * * * *